(12) United States Patent
Burrows

(10) Patent No.: US 10,196,292 B2
(45) Date of Patent: Feb. 5, 2019

(54) DRAINLESS REVERSE OSMOSIS WATER PURIFICATION SYSTEM

(71) Applicant: DS Services of America, Inc., Atlanta, GA (US)

(72) Inventor: Bruce D. Burrows, Valencia, CA (US)

(73) Assignee: DS Services of America, Inc., Atlanta, GA (US)

( * ) Notice: Subject to any disclaimer, the term of this patent is extended or adjusted under 35 U.S.C. 154(b) by 251 days.

(21) Appl. No.: 15/179,108

(22) Filed: Jun. 10, 2016

(65) Prior Publication Data

US 2016/0280575 A1 Sep. 29, 2016

Related U.S. Application Data

(60) Continuation of application No. 13/663,396, filed on Oct. 29, 2012, now Pat. No. 9,371,245, which is a
(Continued)

(51) Int. Cl.
*B01D 24/28* (2006.01)
*B01D 24/38* (2006.01)
(Continued)

(52) U.S. Cl.
CPC .............. *C02F 9/005* (2013.01); *B01D 24/28* (2013.01); *B01D 24/38* (2013.01); *B01D 24/40* (2013.01);
(Continued)

(58) Field of Classification Search
CPC .... B01D 35/143; B01D 35/306; B01D 35/04; B01D 61/025; B01D 61/04; B01D 61/08;
(Continued)

(56) References Cited

U.S. PATENT DOCUMENTS

| 1,058,113 A | 4/1913 | Stuckel |
| 1,249,530 A | 12/1917 | Smith et al. |

(Continued)

FOREIGN PATENT DOCUMENTS

WO 2006081542 8/2006

*Primary Examiner* — Joseph W Drodge
(74) *Attorney, Agent, or Firm* — Seyfarth Shaw LLP; Brian Michaels

(57) ABSTRACT

A drainless reverse osmosis (RO) water purification system provides relatively pure water for on-demand dispensing, while recycling brine to a domestic hot water system. The drainless purification system includes a pre-filter catalyst cartridge for removing chlorine-based contaminants from a tap water supply upstream from an RO membrane. The catalyst is regularly refreshed by a high through-flow of water to a conventional cold water dispense faucet, thereby significantly prolonging the service life of the RO membrane. The RO membrane is incorporated into a multi-cartridge unit adapted for facilitated slide-out removal and replacement as needed. A control valve recycles brine from the RO membrane to the hot water system during pure water production, and recirculates tap water through the RO membrane when a pure water reservoir is substantially filled. The multi-cartridge unit may further include an air filtration system for providing a flow of filtered air.

20 Claims, 23 Drawing Sheets

Related U.S. Application Data continuation-in-part of application No. 12/795,342, filed on Jun. 7, 2010, now Pat. No. 8,298,420, which is a division of application No. 11/870,316, filed on Oct. 10, 2007, now Pat. No. 7,837,866.

(60) Provisional application No. 60/951,265, filed on Jul. 23, 2007, provisional application No. 60/829,178, filed on Oct. 12, 2006.

(51) Int. Cl.

| | | |
|---|---|---|
| *B01D 24/40* | (2006.01) | |
| *B01D 61/04* | (2006.01) | |
| *B01D 61/08* | (2006.01) | |
| *B01D 35/04* | (2006.01) | |
| *B01D 35/30* | (2006.01) | |
| *C02F 1/44* | (2006.01) | |
| *C02F 9/00* | (2006.01) | |
| *C02F 1/72* | (2006.01) | |
| *B01D 61/02* | (2006.01) | |
| *B01D 35/143* | (2006.01) | |
| *C02F 1/00* | (2006.01) | |
| *C02F 101/12* | (2006.01) | |

(52) U.S. Cl.
CPC ........... *B01D 35/04* (2013.01); *B01D 35/143* (2013.01); *B01D 35/306* (2013.01); *B01D 61/025* (2013.01); *B01D 61/04* (2013.01); *B01D 61/08* (2013.01); *C02F 1/003* (2013.01); *C02F 1/441* (2013.01); *C02F 1/725* (2013.01); *B01D 2311/00* (2013.01); *B01D 2311/04* (2013.01); *B01D 2313/16* (2013.01); *B01D 2313/18* (2013.01); *B01D 2313/243* (2013.01); *B01D 2313/42* (2013.01); *B01D 2313/44* (2013.01); *B01D 2313/50* (2013.01); *C02F 1/001* (2013.01); *C02F 2101/12* (2013.01); *C02F 2201/006* (2013.01); *C02F 2209/05* (2013.01); *C02F 2307/06* (2013.01)

(58) Field of Classification Search
CPC ............ B01D 2313/44; B01D 2313/42; B01D 2313/243; B01D 2311/04; B01D 2313/18; B01D 2311/00; B01D 2313/50; B01D 2313/16; B01D 35/027; B01D 35/14; B01D 35/30; B01D 35/301; B01D 35/303; B01D 24/38; B01D 24/40; B01D 24/42; B01D 61/58; B01D 36/02; B01D 2311/2649; B01D 2311/2696; B01D 2313/10; B01D 2313/105; B01D 2313/12; B01D 2313/125; B01D 2313/13; B01D 24/02; B01D 24/28; C02F 9/005; C02F 1/003; C02F 1/725; C02F 1/441; C02F 2307/06; C02F 2101/12; C02F 2201/006; C02F 2209/05; C02F 1/001; C02F 1/625; C02F 2201/004; C02F 2209/005; C02F 2209/008
USPC ..... 210/85, 91, 101, 232–236, 257.1, 257.2, 210/259, 321.6, 335, 435, 440, 443, 444, 210/449, 450, 263, 266
See application file for complete search history.

(56) References Cited

U.S. PATENT DOCUMENTS

| | | |
|---|---|---|
| 1,896,310 A | 2/1933 | Hildebrand |
| 1,992,100 A | 2/1935 | Stein |
| 2,149,847 A | 7/1937 | Kolin |
| 2,220,070 A | 11/1940 | Aiken |
| 2,435,043 A | 1/1948 | Lehde et al. |
| 2,709,785 A | 5/1955 | Fielden |
| 3,015,061 A | 12/1961 | Boeke |
| 3,235,469 A | 2/1966 | Parke |
| 3,603,873 A | 9/1971 | Cirulis |
| 3,630,378 A | 12/1971 | Bauman |
| 3,746,640 A | 7/1973 | Bray |
| 3,794,172 A | 2/1974 | Bray |
| 3,806,798 A | 4/1974 | Gross |
| 4,053,408 A | 10/1977 | O'Cheskey |
| 4,113,613 A * | 9/1978 | Sekoulov ............... C02F 1/004 210/606 |
| 4,176,063 A | 11/1979 | Tyler |
| 4,220,920 A | 9/1980 | Gross |
| 4,321,137 A | 3/1982 | Kohler |
| 4,491,798 A | 1/1985 | Palmer et al. |
| 4,585,554 A | 4/1986 | Burrows |
| 4,595,497 A | 6/1986 | Burrows |
| 4,626,346 A | 12/1986 | Hall |
| 4,642,192 A | 2/1987 | Heskett |
| 4,652,830 A | 3/1987 | Brown |
| 4,657,674 A | 4/1987 | Burrows |
| 4,713,347 A | 12/1987 | Mitchell et al. |
| 4,714,546 A | 12/1987 | Solomon et al. |
| 4,834,873 A | 5/1989 | Burrows |
| 4,853,117 A | 8/1989 | Burrows |
| 4,867,201 A | 9/1989 | Carten |
| 4,885,085 A | 12/1989 | Beall, Jr. |
| 4,904,382 A | 2/1990 | Thomsen |
| 5,009,777 A | 4/1991 | Solomon |
| 5,041,219 A | 8/1991 | Strand et al. |
| 5,045,197 A | 9/1991 | Burrows |
| 5,078,864 A | 1/1992 | Whittier |
| 5,122,265 A | 6/1992 | Mora et al. |
| 5,122,274 A | 6/1992 | Heskett |
| 5,135,654 A | 8/1992 | Heskett |
| 5,157,332 A | 10/1992 | Reese |
| 5,160,608 A | 11/1992 | Norton |
| 5,164,082 A | 11/1992 | Lin |
| 5,173,178 A | 12/1992 | Kawashima et al. |
| 5,188,727 A | 2/1993 | Kurth et al. |
| 5,198,118 A | 3/1993 | Heskett |
| 5,234,605 A | 8/1993 | Reipur et al. |
| 5,244,361 A | 9/1993 | Solomon |
| 5,250,187 A | 10/1993 | Franks |
| 5,269,932 A | 12/1993 | Heskett |
| 5,275,737 A | 1/1994 | Heskett |
| 5,282,972 A | 2/1994 | Hanna et al. |
| 5,314,623 A | 5/1994 | Heskett |
| 5,340,478 A | 8/1994 | Strand et al. |
| 5,380,428 A | 1/1995 | Solomon |
| 5,415,770 A | 5/1995 | Heskett |
| 5,433,856 A | 7/1995 | Heskett |
| 5,454,944 A | 10/1995 | Clack |
| 5,510,034 A | 4/1996 | Heskett |
| 5,520,816 A | 5/1996 | Kuepper |
| 5,599,454 A | 2/1997 | Heskett |
| 5,603,844 A | 2/1997 | Murphy et al. |
| 5,628,895 A | 5/1997 | Zucholl |
| 5,635,063 A * | 6/1997 | Rajan .................... C02F 1/28 210/266 |
| 5,639,374 A | 6/1997 | Monroe et al. |
| 5,660,720 A | 8/1997 | Walling |
| 5,685,981 A | 11/1997 | Koslow |
| 5,700,371 A | 12/1997 | Koslow |
| 5,833,859 A | 11/1998 | Heskett |
| 5,837,134 A | 11/1998 | Heskett |
| 5,858,219 A | 1/1999 | Kusmierz et al. |
| 5,879,558 A | 3/1999 | Monroe et al. |
| 5,879,565 A | 3/1999 | Kusmierz et al. |
| 5,951,869 A | 9/1999 | Heskett |
| 5,958,232 A | 9/1999 | Chen |
| 6,001,249 A | 12/1999 | Bailey et al. |
| 6,042,729 A | 3/2000 | Chau |
| 6,075,367 A | 6/2000 | Brugger |
| 6,099,735 A | 8/2000 | Kelada |
| 6,103,125 A | 8/2000 | Kuepper |
| 6,132,611 A | 10/2000 | Yuen |

(56) References Cited

U.S. PATENT DOCUMENTS

| | | | |
|---|---|---|---|
| 6,149,809 A | 11/2000 | Chen | |
| 6,197,204 B1 | 3/2001 | Heskett | |
| 6,221,245 B1 * | 4/2001 | Colburn | C02F 1/481 210/137 |
| 6,231,763 B1 | 5/2001 | Chau | |
| 6,290,845 B1 | 9/2001 | Brane et al. | |
| 6,391,184 B1 | 5/2002 | Orolin et al. | |
| 6,414,493 B1 | 7/2002 | Rezvani | |
| 6,447,678 B2 | 9/2002 | Chau | |
| 6,517,720 B1 | 2/2003 | Aldred et al. | |
| 6,524,472 B2 | 2/2003 | Monroe | |
| 6,524,483 B1 | 2/2003 | Monroe | |
| 6,524,540 B1 * | 2/2003 | Heinig, Jr. | B01J 23/50 422/211 |
| 6,572,764 B2 | 6/2003 | Mullaney | |
| 6,926,821 B2 | 8/2005 | Giordano et al. | |
| 6,958,118 B2 | 10/2005 | Hill et al. | |
| 6,995,563 B2 | 2/2006 | Talutis | |
| 7,089,763 B2 | 8/2006 | Forsberg et al. | |
| 7,285,210 B2 | 10/2007 | Schmitt | |
| 7,387,210 B2 | 6/2008 | Burrows et al. | |
| 7,460,362 B2 | 12/2008 | Lam et al. | |
| 7,476,312 B2 | 1/2009 | Laing et al. | |
| 7,513,996 B2 | 4/2009 | Kloos et al. | |
| 7,572,373 B2 | 8/2009 | El-Hindi | |
| 7,837,866 B2 | 11/2010 | Burrows | |
| 8,298,420 B2 | 10/2012 | Burrows | |
| 8,398,852 B2 | 3/2013 | Burrows | |
| 8,424,554 B2 | 4/2013 | Burrows | |
| 9,371,245 B2 | 6/2016 | Burrows | |
| 9,919,933 B2 * | 3/2018 | Burrows | C02F 1/36 |
| 2003/0010721 A1 | 1/2003 | Aldred et al. | |
| 2003/0183574 A1 | 10/2003 | Claesson et al. | |
| 2005/0087492 A1 | 4/2005 | Schmitt | |
| 2005/0092665 A1 | 5/2005 | Kirchner | |
| 2005/0194297 A1 | 9/2005 | Dorward | |
| 2005/0194317 A1 * | 9/2005 | Ikeyama | B01D 35/143 210/652 |
| 2005/0205485 A1 | 9/2005 | Jorgensen | |
| 2006/0157391 A1 | 7/2006 | Astle et al. | |
| 2007/0108138 A1 * | 5/2007 | Martin | B01D 24/08 210/793 |
| 2008/0110816 A1 | 5/2008 | Leavitt et al. | |
| 2015/0166360 A1 | 6/2015 | Burrows | |
| 2015/0166369 A1 | 6/2015 | Burrows | |
| 2016/0280875 A1 | 9/2016 | Burrows | |

* cited by examiner

DRAINLESS REVERSE OSMOSIS WATER PURIFICATION SYSTEM

BACKGROUND OF THE INVENTION

This invention relates generally to improvements in water purification systems of the type having a reverse osmosis (RO) unit or the like for removing dissolved ionic material and other contaminants from an ordinary supply of tap water or the like. More particularly, this invention relates to an improved water purification system having a reverse osmosis unit adapted for providing a supply of relatively purified water over a significantly extended operating life, and wherein water waste during normal system operation is substantially eliminated.

Water purification systems in general are well-known in the art of the type having a reverse osmosis (RO) unit or membrane for converting an incoming supply of ordinary tap or feed water into relatively purified water for use in cooking, drinking, etc. In general terms, the reverse osmosis unit comprises a semi-permeable RO membrane through which a portion of the tap water supply is passed, such that the membrane acts essentially as a filter to remove dissolved metallic ions and the like as well as other contaminants and undesired particulate matter from the tap water. In normal operation, these impurities are removed from one portion of the water flow and concentrated in another portion of the water flow, commonly referred to as retentate or brine, which is normally discharged as waste to a drain. The thus-produced flow of relatively purified water is available for immediate dispensing for use, and/or for temporary storage within a suitable reservoir or vessel awaiting dispensing for use. A pure water dispense faucet mounted typically on or adjacent to a kitchen-type sink or the like is manually operable to dispense the produced purified water. While the specific construction and operation of such RO water purification systems may vary, such systems are exemplified by those shown and described in U.S. Pat. Nos. 4,585,554; 4,595,497; 4,657,674; and 5,045,197.

One disadvantage associated with reverse osmosis purification systems relates to the fact that retentate or brine outflow from the RO membrane is normally discarded as waste. In a typical RO system operating under standard domestic water supply pressures, the ratio of brine outflow to produced purified water outflow can be on the order of about 4:1. Accordingly, the discarded brine flow is sometimes perceived as a relatively substantial waste of water which can be significant in areas wherein the water supply is limited. As a result, many residential and commercial water customers have favored use of bottled water as a purified water source, despite the costs and inconveniences associated with delivery, storage and changeover of large (typically 5 gallon) water bottles with respect to a bottled water cooler.

Another disadvantage associated with reverse osmosis systems relates to the typically limited service life of the RO membrane and other pre-filter and post-filter elements typically associated therewith. More specifically, many RO systems use a pre-filter element typically including a carbon-based filtration media for removing some contaminants from a tap water inflow at a location upstream from the RO membrane. One important function of this pre-filter element is to remove contaminants that would otherwise shorten the operating service life of the RO membrane. A downstream-located post-filter element is also commonly provided for additional water filtration and purification before dispensing. This array of pre- and post-filter elements, in combination with the RO membrane, is often provided in the form of individual cartridges designed for facilitated disassembly from and re-assembly with a unitary-type manifold. See, for example, U.S. Pat. No. 5,045,197. Despite the fact that cartridge replacement may be required only once each year, and despite efforts to make cartridge changeover an intuitively simple process, many customers are reluctant to handle this task. Instead, replacement of the various RO system cartridges has largely remained the responsibility of a water service company, thereby entailing regular and relatively costly service calls to each customer's residence or place of business. The requirement for regular service calls dramatically increases the overall operating cost of the RO system, thereby reducing or eliminating apparent advantages relative to conventional bottled water coolers and related bottle delivery systems.

There exists, therefore, a significant need for further improvements in and to reverse osmosis water purification systems, wherein water waste is substantially eliminated, and further wherein the service life of a reverse osmosis (RO) membrane is significantly extended for at least a period of several years without requiring attention by service personnel. The present invention fulfills these needs and provided further related advantages.

SUMMARY OF THE INVENTION

In accordance with the invention, an improved drainless reverse osmosis (RO) water purification system is provided to produce relatively pure water for on-demand dispensing, while recycling retentate or brine in a manner which substantially eliminates water waste. The improved RO system further includes a catalyst pre-filter for treating a tap water supply to remove contaminants, particularly such as chlorine-based contaminants, prior to or upstream from a reverse osmosis (RO) membrane, thereby significantly extending the service life of the RO membrane, and wherein this catalyst pre-filter is regularly refreshed or renewed to provide a compatible extended service life. In addition, the RO membrane is incorporated into a multi-cartridge unit including an additional pre-membrane filter element and a post-membrane filter element, wherein this multi-cartridge unit is adapted for quick and easy slide-out removal and slide-fit installation of a replacement unit, when and if required. Moreover, the RO system may further include a source of filtered, relatively purified air.

In the preferred form, the catalyst pre-filter is coupled to a conventional and typically cold tap water supply source. The catalyst pre-filter carries a supply of a catalyst in particulate form, such as a copper-zinc media. During normal operation of the RO system to produce relatively purified water, a relatively slow tap water flow proceeds upwardly through the catalyst particulate, at a rate and pressure insufficient to disturb the catalyst bed, resulting in catalyzation of chlorine-based contaminants such as chlorine and chloramines to other forms not harmful to the RO membrane, as well as retention of particulate contaminants. The catalyst pre-filter is also coupled in-line between the tap water supply source and a conventional tap water cold dispense faucet. Each time the cold dispense faucet is turned on at a typical, relatively high flow rate, the tap water upflow through the catalyst particulate functions to lift and stir the particulate from the settled bed to a substantially fluidized and turbulently intermixing state. As the particulate turbulently intermixes, the catalyst particles abrade for removal of surface oxidation and are thus renewed or refreshed. The catalyst particulate is retained within the catalyst pre-filter, whereas the removed oxidation and any entrapped particulate contaminants are flushed with the water flow to and through the cold water dispense faucet.

During pure water production, the catalyst pre-filter discharges a filtered tap water outflow to the multi-cartridge unit, for series flow to the pre-membrane filter element, the RO membrane, and the post-membrane filter element. The pre- and post-membrane filter elements may include a carbon-based filtration media. The RO membrane separates the water flow into a relative purified water outflow having contaminants substantially removed therefrom, and a retentate or brine outflow having the contaminants substantially concentrated therein. In accordance with one aspect of the invention, the brine outflow is not discharged as waste to a drain, but is instead pumped to a hot water circuit forming a portion of a domestic water supply system. As such, the brine outflow is recycled in a manner whereby recirculation thereof to the RO membrane is substantially eliminated.

The produced purified water is available for immediate dispensing as by means of a pure water dispense faucet. Alternately, the produced purified water is directed to and stored within a pure water reservoir awaiting dispensing via the pure water dispense faucet. In the preferred form, water flowing to the pure water dispense faucet may be further subjected to a final catalyst filter having a particulate media including zinc to enhance water freshness and sanitation.

A control valve monitors the volume of water contained within the pure water reservoir, and functions to disconnect the brine outflow from the hot water system when the pure water reservoir reaches a substantially filled condition and pure water production ceases. In this mode, the tap water inflow to the RO membrane flows untreated to the brine outflow side and is continuously recirculated by the control valve between the catalyst pre-filter and the RO membrane. Upon resumed pure water production, the control valve re-directs the brine port outflow to the hot water system. In one preferred form, the control valve comprises a pressure-responsive valve assembly for shifting the water outflow from the RO membrane brine port in response to water pressure within the pure water storage reservoir.

The multi-cartridge unit including the RO membrane and the pre- and post-membrane filter elements is provided as a unitary device adapted for quick and easy removal from and replacement within a manifold housing, in a unidirectional or one-way installation with the cartridges properly connected to system plumbing lines. In the preferred form, the multi-cartridge unit is adapted for one-way drop-in mounting into a housing drawer adapted for slide-out displacement for access to and removal of the cartridge unit. A replacement multi-cartridge unit is drop-fit installed into the housing drawer which is then slidably advanced into the manifold housing in proper coupled relation with the system plumbing lines.

The manifold housing may additionally include an air filtration system including a removably mounted air filter and a fan for drawing air over the air filter for purification. Filtered air is coupled from the manifold housing to the pure water dispense faucet to provide relatively purified air in the same room within which the purified water is available.

The RO system may further include a conductivity monitor system of the general type including water-contacting electrodes and indicator means such as one or more indicator lights on the pure water dispense faucet for indicating a need to replace the RO membrane. In the preferred form, the indicator lights are adapted to provide a first color (such as green or blue) when the pure water faucet is open and the RO membrane is functioning properly, and a second color (such as yellow or red) to indicate a need for RO membrane replacement. In the preferred form, the monitor system will illuminate the second color continuously, as by continuous lighting or continuous blinking of the second color until the RO membrane is replaced. In an alternate preferred form, the monitor system is programmed for illuminating the first and second colors in an alternating blinking sequence until the RO membrane is replaced. The pure water dispense faucet may further incorporate a photocell for detecting ambient light intensity, and for operating one or more of the indicator lights in a night-light limited illumination mode.

Upon replacement of the multi-cartridge unit, to replace the RO membrane, the monitor system is re-set. In a preferred form, such resetting occurs by providing each multi-cartridge unit with a unique code carried thereby, such as a unique bar code printed on a label on the multi-cartridge unit at a predetermined location. A reader mounted on or within the manifold housing is responsive to the unique code on the multi-cartridge unit, for re-setting the conductivity monitor system. That is, removal of a multi-cartridge unit followed by re-installation of the same unit will not re-set the monitor system. But installation of a different multi-cartridge unit having a different unique code thereon will re-set the monitor system.

Other features and advantages of the present invention will become apparent from the following more detailed description, taken in connection with the accompanying drawing which illustrate, by way of example, the principals of the present invention.

BRIEF DESCRIPTION OF THE DRAWINGS

The accompanying drawings illustrate the invention. In such drawings:

FIG. 24 is an enlarged fragmented perspective view similar to FIG. 21, but with the drawer front panel removed for illustrating components of the improved latch mechanism.

DETAILED DESCRIPTION OF THE PREFERRED EMBODIMENTS

Figure 1:
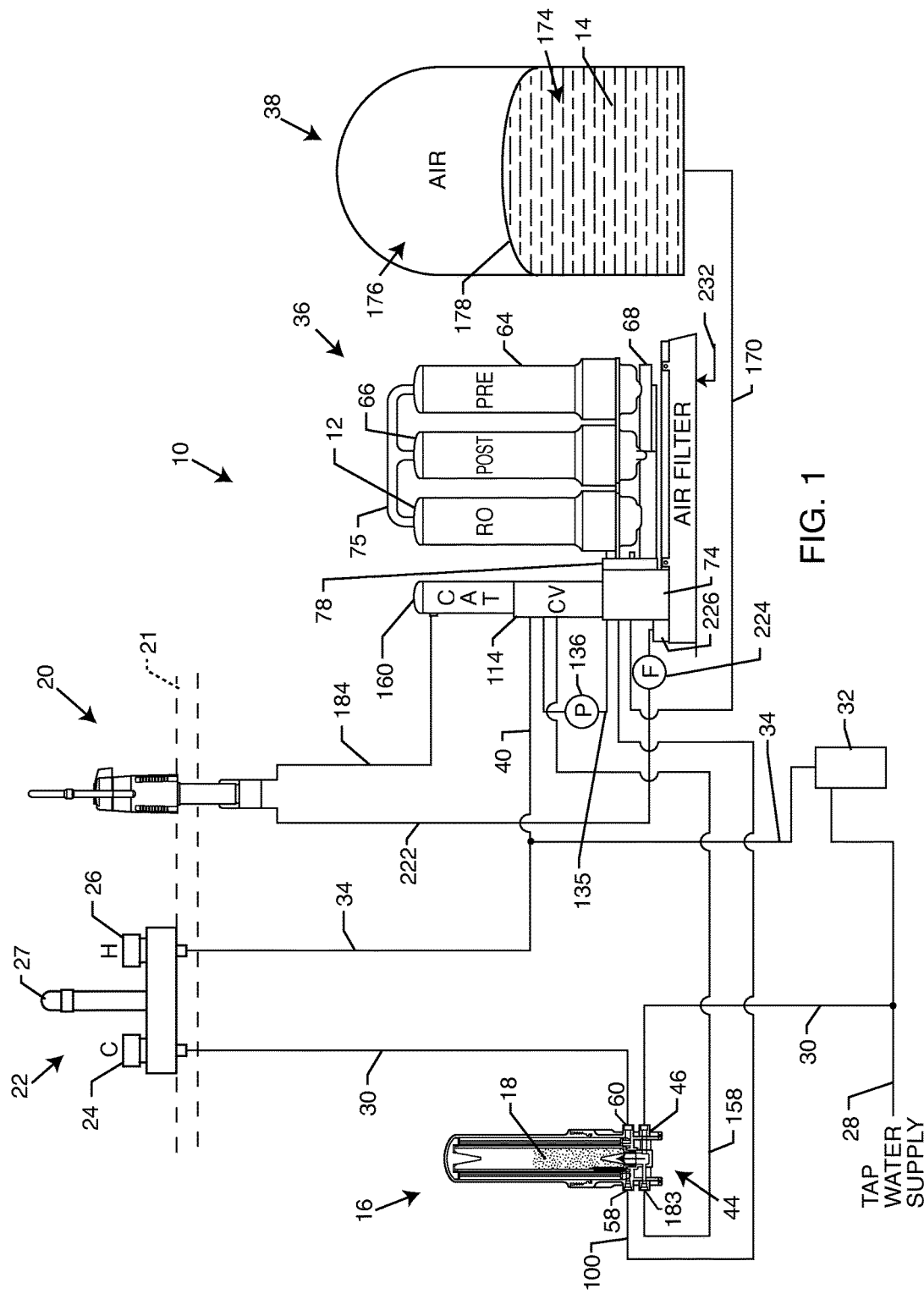
FIG. 1 is a schematic diagram illustrating a drainless reverse osmosis water purification system embodying the novel features of the present invention.

As shown in the exemplary drawings, an improved reverse osmosis (RO) water purification system referred to generally in FIG. 1 by the reference numeral 10 includes a reverse osmosis (RO) cartridge 12 having a reverse osmosis (RO) membrane therein for separating a tap water inflow into relatively purified water 14 available for on-demand dispensing, and a so-called retentate or brine flow having contaminants and impurities substantially concentrated therein. In accordance with the invention, during pure water production, the brine flow is recycled to a hot water side or hot water circuit of a domestic water supply system to avoid water waste. In addition, tap water inflow to the RO cartridge is pretreated by flow through a catalyst pre-filter 16 to catalyze chemical contaminants which would otherwise be harmful to the RO membrane, thereby significantly increasing the service life of the RO membrane. A particulate catalyst 18 within the catalyst pre-filter 16 is periodically refreshed to achieve extended service life compatible with the extended service life of the RO membrane.

The illustrative reverse osmosis water purification system 10 is designed to provide a ready supply of substantially purified water 14 for drinking and cooking purposes, etc. The system 10 is generally designed for residential or household use, or for use in a commercial facility particularly such as an office or the like, installed typically within the compact cabinet space located beneath a kitchen-type sink (not shown) or the like, with a pure water dispense faucet 20 normally mounted on a countertop 21 on or adjacent the sink for on-demand pure water dispensing. In this regard, the pure water dispense faucet 20 is typically installed alongside or in close proximity with a conventional faucet or faucet set 22 including cold and hot water faucet valves 24 and 26 operable for respectively dispensing untreated cold water and untreated hot water, or a tempered mixture thereof, through one or more dispense spouts 27.

A standard domestic water supply system includes a tap water supply 28 coupled to a cold water circuit 30 to which the cold water faucet valve 24 is also connected. The tap water supply 28 is additionally coupled through a water heater 32 to a hot water circuit 34 to which the hot water faucet valve 26 is connected. Persons skilled in the art will appreciate that the illustrative cold and hot water circuits 30, 34 will normally incorporate multiple hot and cold water dispense sites, each with a corresponding dispense faucet set 22 or the like. In addition, persons skilled in the art will recognize that single-handle faucet sets can be used for dispensing cold water, hot water, or a tempered mixture thereof.

In general, the purification system 10 receives a tap water inflow by coupling the catalyst pre-filter 16 into the domestic cold water circuit 30. During normal operation, this cold tap water inflow passes through the catalyst pre-filter 16 at a relatively slow flow rate for treatment, and the thus-treated water is delivered to a multi-cartridge unit 36 which includes the RO cartridge 12 having the RO membrane contained therein. The RO membrane within the RO cartridge 12 separates the tap water inflow into the produced relatively purified water 14 which is delivered to a storage reservoir 38 where it is available for on-demand dispensing, and the retentate or brine flow which is normally recycled through a recycle conduit 40 to the hot water side of the domestic water system.

In this regard, persons skilled in the art will recognize and appreciate that the purified water 14 has impurities substantially removed therefrom, whereas these removed impurities are retained within and carried off by the retentate or brine flow for recycling to the water supply system, and in the preferred embodiment, to the hot water circuit 34 of the water supply system. While the term brine is commonly used to refer to this retentate flow, persons skilled in the art will understand that the level of impurities carried by this brine flow does not render the water toxic or harmful for a wide range of traditional domestic water supply uses such as washing, bathing, etc. Indeed, when this retentate or brine flow is intermixed with other water within the water supply system, the proportional increase in overall impurities is virtually unnoticeable.

In accordance with one primary aspect of the invention, the catalyst pre-filter 16 includes the particulate catalyst 18 (FIG. 2) for pre-treating the tap water inflow in a manner to effectively catalyze chemical contaminants known to be harmful and thus known to significantly reduce the service life of the RO membrane within the RO cartridge 12. Such chemical contaminants commonly include chlorines and chloramines which are commonly present in domestic water supplies. Importantly, this particulate catalyst 18 is regularly refreshed or renewed by a rapid flush-flow of the cold tap water supply through the catalyst pre-filter 16 each time the cold water faucet valve 24 is turned on for a substantial cold water flow rate. Accordingly, the service life of the particulate catalyst 18 is also significantly extended for compatibility with extended service life of the RO membrane, with a preferred service life for these components being on the order of about 5-7 years.

Figure 2:
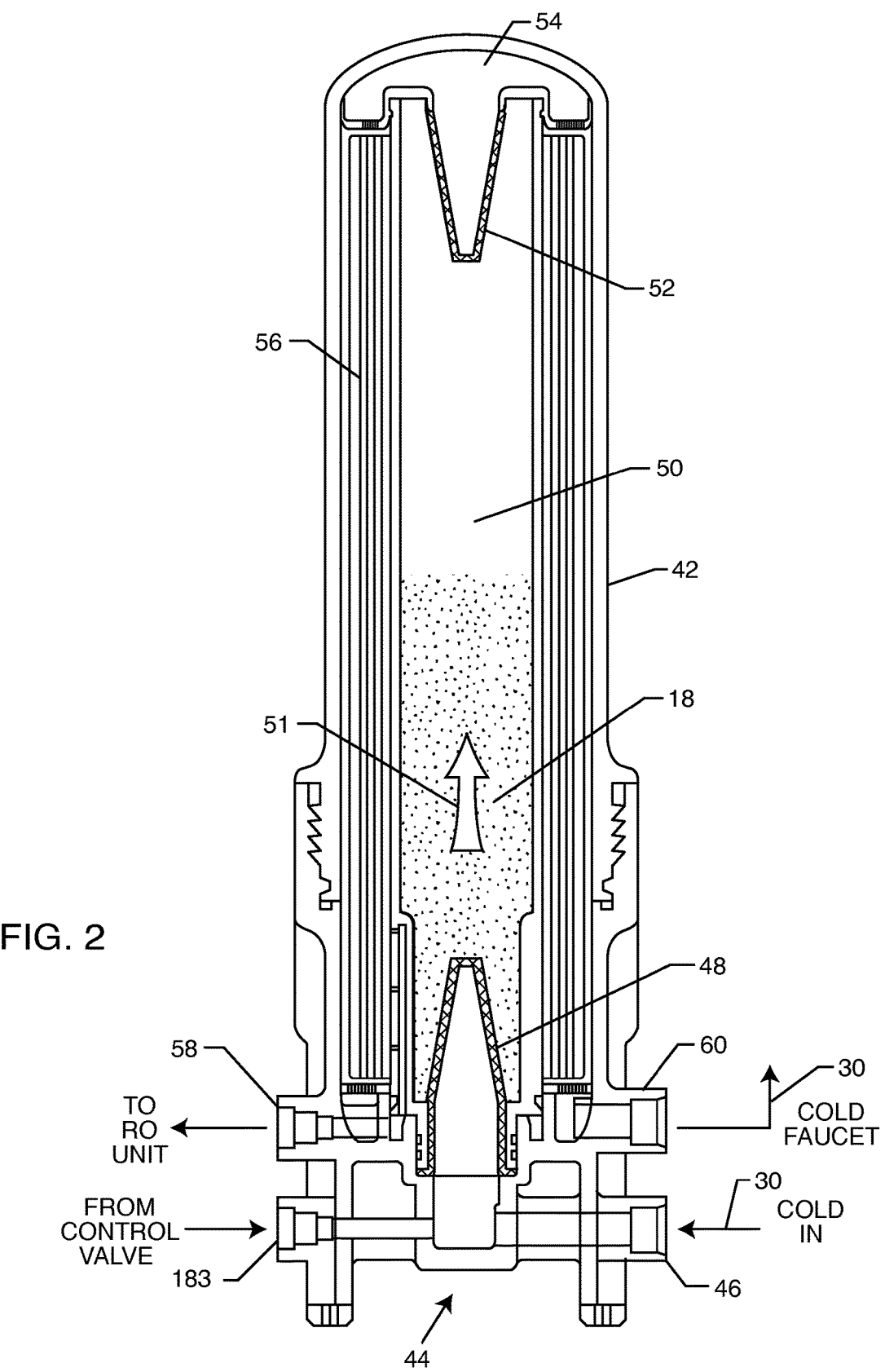
FIG. 2 is an enlarged vertical sectional view of a catalyst pre-filter cartridge for use in the invention, and depicting a particulate catalyst in a normal settled bed orientation for pure water production.

FIG. 2 shows the catalyst pre-filter 16 is more detail. As shown, the catalyst pre-filter 16 comprises an upright housing 42 which may have a generally cylindrical cross sectional shape, to include a lower multi-port fitting 44 defining a tap water inflow port 46 connected to the cold water supply circuit 30. Cold tap water is thus available to flow through this inflow port 46 and upwardly through a lower inlet filter screen 48 of generally upwardly projecting conical geometry into an internal pre-filter chamber 50. This pre-filter chamber 50 is partially filled with the particulate catalyst 18, with FIG. 2 showing this particulate catalyst in the form of a settled bed occupying up to about ½ of the volume of the pre-filter chamber 50. This particulate catalyst 18 comprises, in a preferred form, a metal-based particulate including copper and zinc components, with one preferred catalyst material being available from KDF Fluid Treatment, Inc., of Constantine, Mich., under product designation KDF-55. See also U.S. Pat. No. 5,135,654, which is incorporated by reference herein.

During normal pure water production, with the cold water faucet valve 24 in a normally closed position, the tap water inflow into the pre-filter chamber 50 proceeds upwardly as indicated by arrow 51 into and through the settled catalyst bed at a relatively slow flow rate which is insufficient to disturb or disrupt the particulate catalyst 18 from the illustrative settled bed. As a result, the water-catalyst contact or residence time is substantial, and sufficient for substantially thorough catalyzation of chemical contaminants as by oxidation reduction reaction. Particulate contaminants are also trapped within the catalyst bed, and thereby removed from the water upflow therethrough. The treated water flow then proceeds upwardly through the open upper portion of the pre-filter chamber 50, and through an upper filter screen 52 into a small head space 54 before turning downwardly for passage through a spiral-wrapped and/or pleated filter element 56 positioned annularly about the pre-filter chamber 50. A stainless steel mesh material may also be used for the filter element 56. The filter element 56 is adapted to trap additional particulate contaminants, preferably to a size of about 5 microns, before coupling the water flow to a first lower water outflow port 58 formed as a portion of the lower multi-port fitting 44. From this outflow port 58, the pretreated water is delivered to the multi-cartridge unit 36 including the RO cartridge 12 for pure water production, as will be described in more detail. Persons skilled in the art will understand that the filter element 56 is optional, wherein the size of the catalyst particles may be chosen to entrap and retain small-sized particulate contaminants.

The particulate catalyst 18 is especially effective in catalyzing chlorine-based chemical contaminants of the type commonly present in many domestic water supply systems for sanitizing the water supply. Such constituents are harmful to a semi-permeable membrane of the type used in the RO cartridge 12 for pure water production, typically resulting in a dramatically shortened membrane service life. By catalyzing these chemical contaminants to a form that is not harmful to the RO cartridge 12, the service life of the RO membrane dramatically increases. Such catalyzation is accompanied by an oxidation reduction reaction which results in an oxidation layer on the catalyst particles, wherein, over time, this oxidation layer can obstruct or interfere with good water-catalyst contact. Accordingly, over a period of time, the effectiveness of the particulate catalyst 18 can be significantly diminished.

Figure 2A:
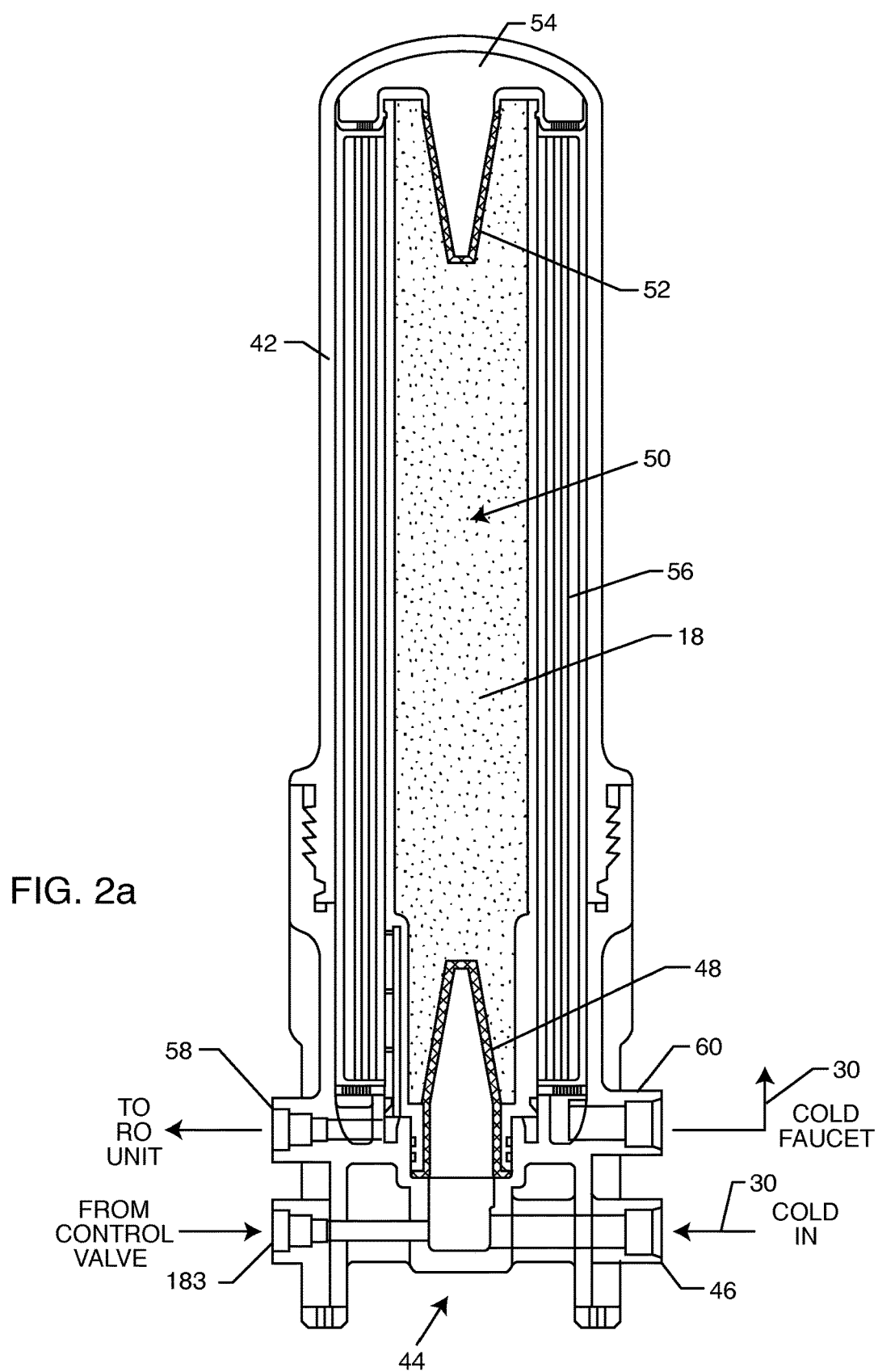
FIG. 2*a* is a vertical sectional view of the catalyst pre-filter cartridge, similar to FIG. 2, but showing the particulate catalyst in a turbulently agitated flush-flow mode for catalyst renewal.
Figure 3:
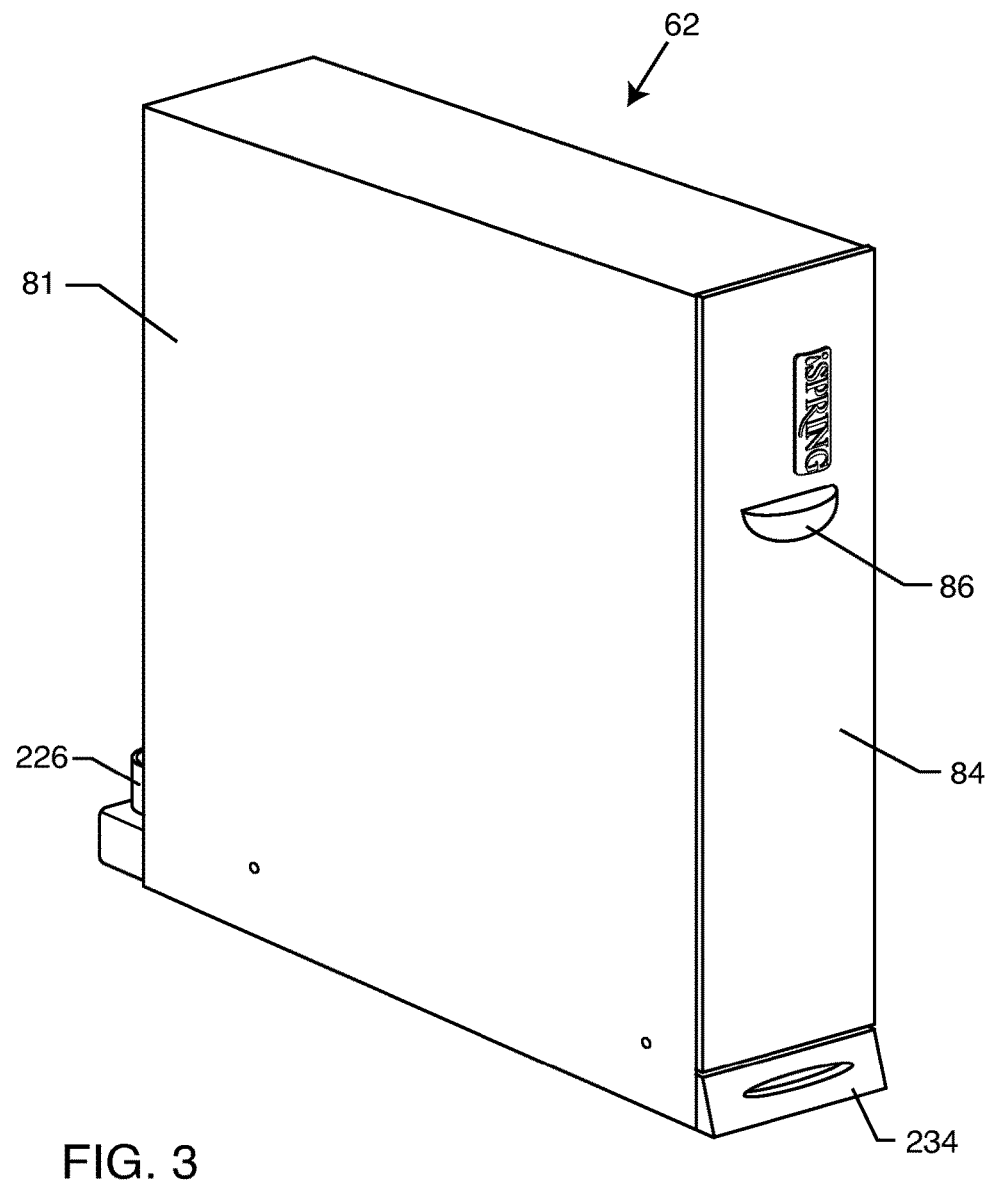
FIG. 3 is an enlarged perspective view showing an exemplary manifold housing for use in the invention.

To avoid this reduction in catalyst effectiveness, the particulate catalyst 18 is regularly renewed or refreshed by removing the oxidation surface layer therefrom and flushing this removed oxidation and any trapped particulate contaminants from the pre-filter 16. This is accomplished by connecting the catalyst pre-filter 16 via a second lower water outflow port 60 to the cold water faucet valve 24 via the cold water circuit 30. In this regard, normal installation of the water purification system 10 into the cabinet space underneath a sink having the faucet set 22 mounted thereon conveniently positions the pre-filter 16 close to the faucet set for quick and easy flush-flow to renew the catalyst 18. Accordingly, when the cold water faucet is turned on periodically with a substantial flow rate, the upflow passage of tap water through the pre-filter chamber 50 is dramatically increased and is sufficient to lift and turbulently stir the particulate catalyst 18 throughout the entire chamber volume, as viewed in FIG. 2a. As this rapid flush-flow occurs through the pre-filter chamber 50, the catalyst particles tumble and abrade against one another in the form of a turbulent fluidized bed, thereby abrading off the formed oxidation layer thereon for flush-flow of this oxidation layer with the water past the upper filter screen 52 and further through the second outflow port 60 to the cold water faucet 24. Importantly, as a result, the particulate catalyst 18 is effectively renewed or refreshed for enhanced effectiveness with an extended service life compatible with the extended service life of the RO membrane. In one preferred form, the filter element 56 is omitted (as previously noted) to avoid clogging thereof by flushed oxidation and other entrapped contaminant particles. Upon closing the cold water faucet valve 24, this rapid flush flow through the catalyst 18 ceases, and the slow pure water production flow resumes thereby allowing the catalyst particles to re-settle into the bed configuration shown in FIG. 2.

While the illustrative drawings show the conical filter screen 48 at the lower end of the pre-filter chamber 50, persons skilled in the art will appreciate that alternative water inflow geometries into contact with the particulate catalyst 18 may be used. Such alternative water inflow configurations may include, but are not limited to, upwardly jetted arrangements conducive to substantially thorough fluidization of the particulate catalyst 18 when the cold water faucet valve 24 is turned on, and for substantially thorough water-particulate contact without fluidization during pure water production with the cold water faucet valve 24 turned off.

Figure 4:
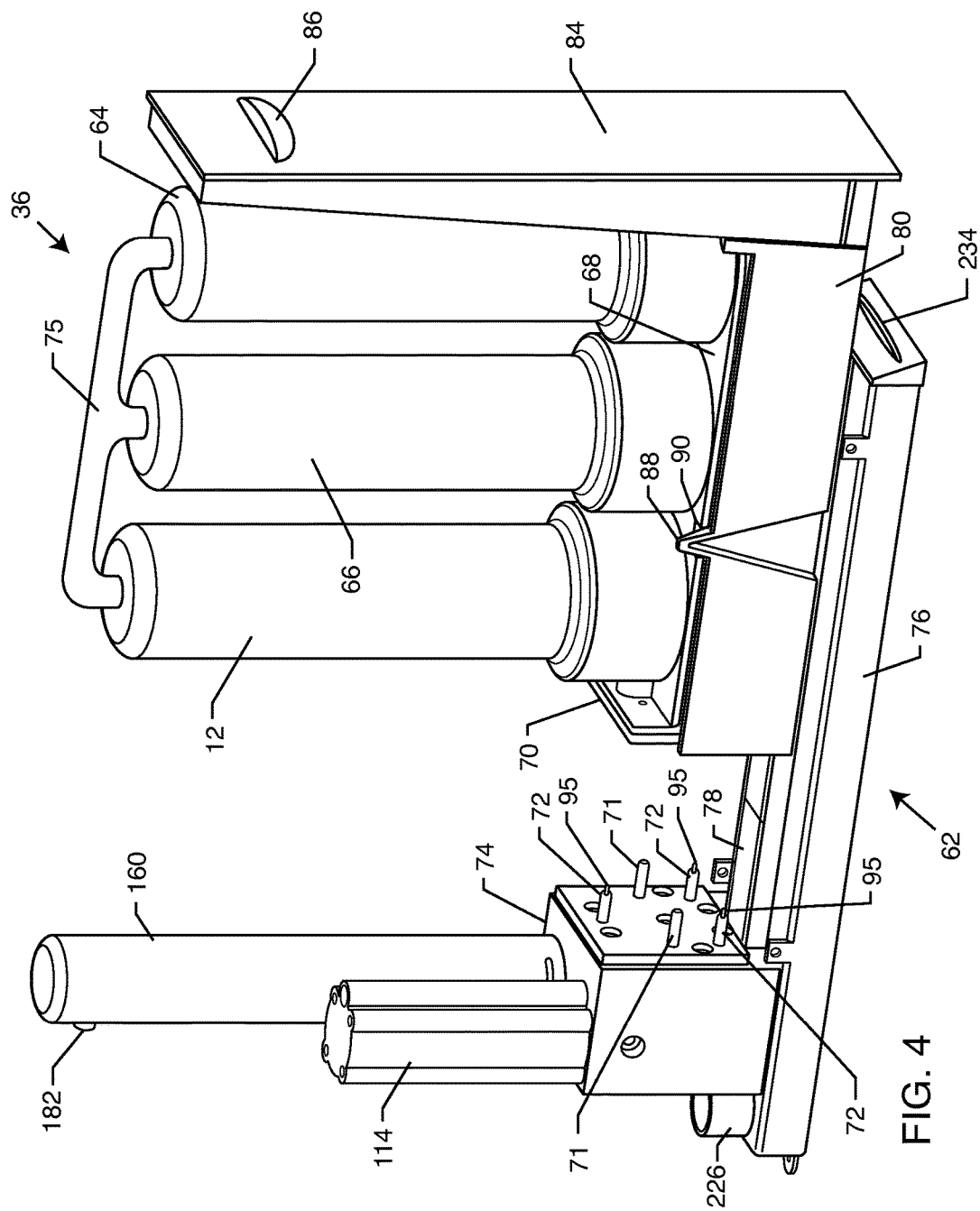
FIG. 4 is an enlarged perspective view of the manifold housing of FIG. 3, with a housing cover removed to illustrate internally mounted components, and with a slidably retractable drawer carrying a removably mounted multi-cartridge unit including a reverse osmosis (RO) cartridge.
Figure 5:
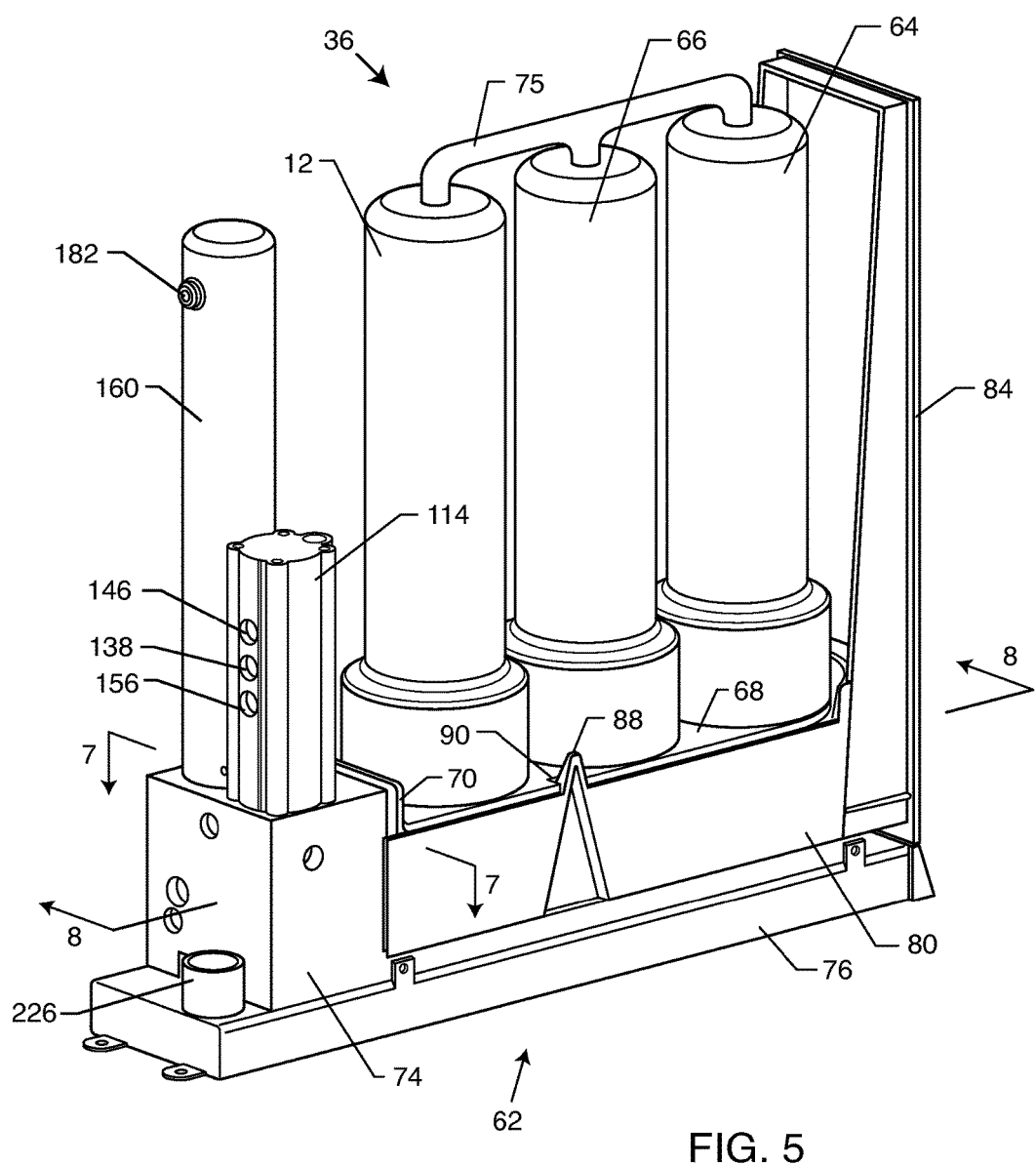
FIG. 5 is an alternative perspective view of the manifold housing similar to FIG. 4, with the housing cover removed and showing the slide-out drawer with multi-cartridge unit in a fully installed position.
Figure 6:
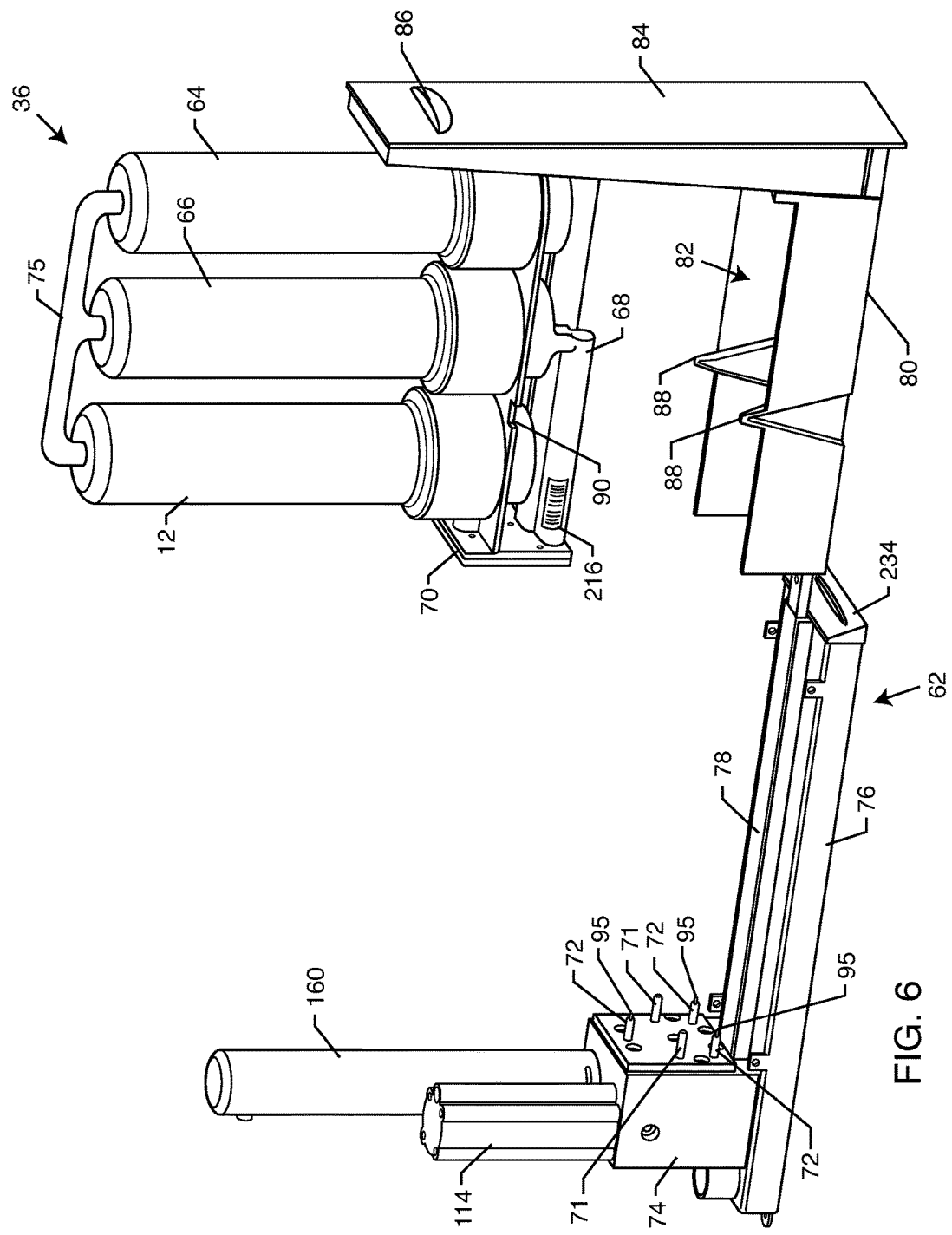
FIG. 6 is a further perspective view of the manifold housing similar to FIGS. 4 and 5, but illustrating the slide-out drawer in a retracted or open state, and showing the removable multi-cartridge unit in exploded relation therewith.

The multi-cartridge unit 36 including the RO cartridge 12 is removably installed into a compact manifold housing 62, as shown best in FIGS. 3-6. As shown in accordance with a preferred form, the multi-cartridge unit 36 comprises a trio of cartridges including the RO cartridge 12 having the RO membrane therein, in combination with a pre-membrane filter cartridge 64 and a post-membrane filter cartridge 66 (FIGS. 4-6). This trio of cartridges 12, 64 and 66 are preassembled on a manifold base 68 configured to define a predetermined sequential flow path for water flow to and through these cartridges 12, 64 and 66. The manifold base 68 carries a ported end plate 70 for slide-fit connection with a pair of cylindrical alignment pins 71 and a plurality of cylindrical water conduit members 72 (FIGS. 4 and 6-7) protruding from a fixed manifold 74 within the housing 62. A handle 75 conveniently interconnects the upper ends of the three cartridges 12, 64 and 66 for facilitated manual grasping and manipulation of the multi-cartridge unit 36 for quick and easy drop-fit installation into or lift-out removal from the housing 62.

In one preferred form, this handle 75 is constructed from a flexible fabric material such as canvas belt of the like suitable for easy manual grasping, but collapsible upon release to occupy minimal space within the manifold housing 62. Accordingly, the collapsible handle 75 permits use of cartridges 12, 64 and 66 of substantially maximum or optimized heights, thereby further enhancing the service life of the multi-cartridge unit 36.

As shown best in FIGS. 4 and 6, the housing 62 includes an internal base 76 having the fixed manifold 74 mounted generally at an inboard end thereof. An extensible slide unit 78 is mounted on this internal base 76 for supporting a drawer 80 adapted for sliding movement between an advanced or closed position within a manifold cover 81 (FIGS. 3 and 5) and an open or retracted position (FIGS. 4 and 6) with a portion of the drawer 80 exposed at a front end of the manifold housing 62. This movable drawer 80 defines an upwardly open pocket 82 (FIG. 6) for drop-in reception of the manifold base 68 of the multi-cartridge unit 36. A front margin of the drawer 80 carries a closure panel 84 with a drawer pull 86 thereon for facilitated manual movement of the drawer 80 between the open and closed positions. The drawer pocket 82 (FIG. 6) is defined by irregular surfaces such as the illustrative triangular indents 88 formed at longitudinally off-center positions along the drawer length, for mated reception into notches 90 formed in the sides of the manifold base 68, thereby assuring unidirectional or one-way drop-in reception of the multi-cartridge unit 36 into the drawer 80.

Figure 7:
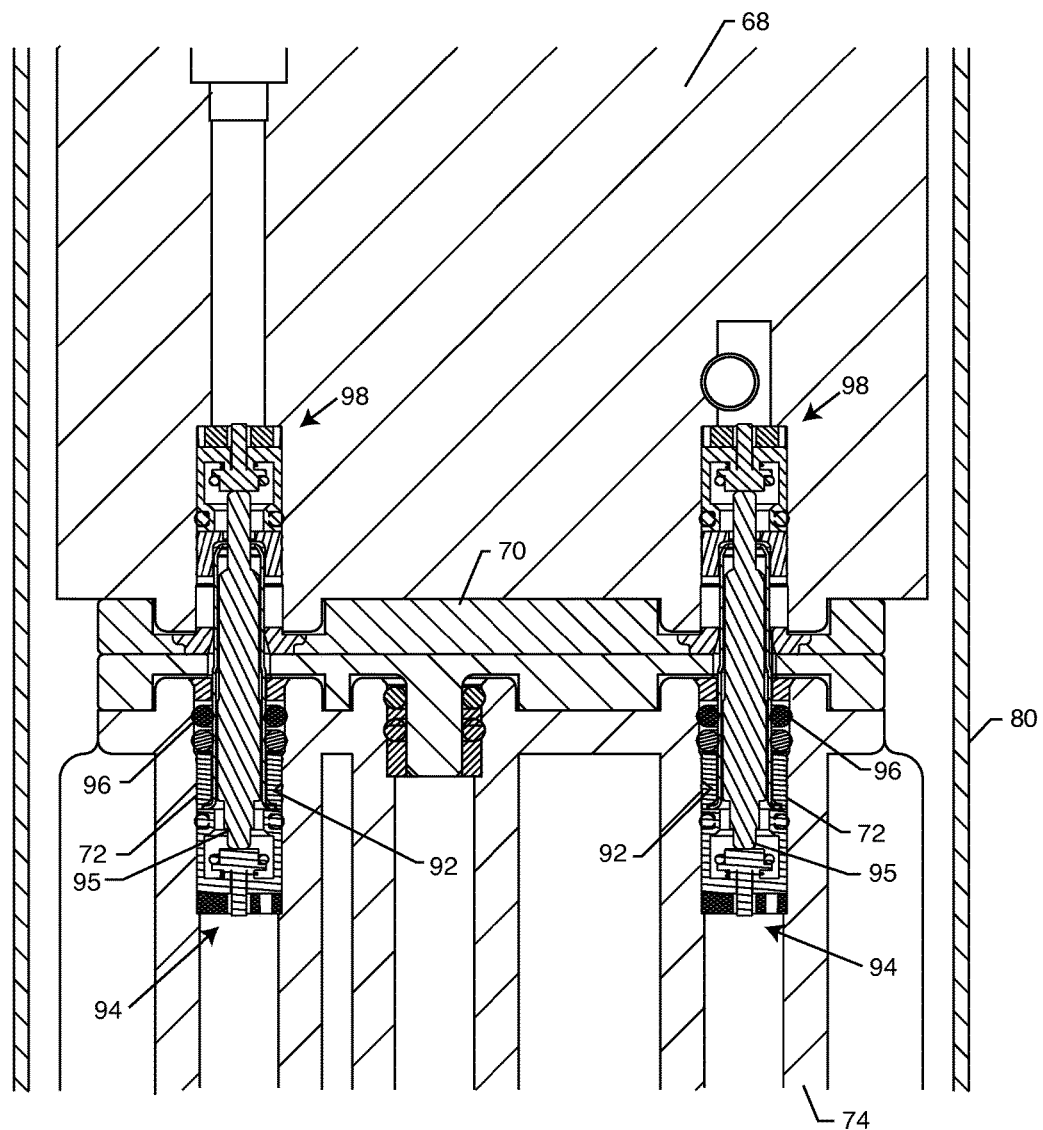
FIG. 7 is an enlarged fragmented cross-sectional view taken generally on the line 7-7 of FIG. 5.
Figure 8:
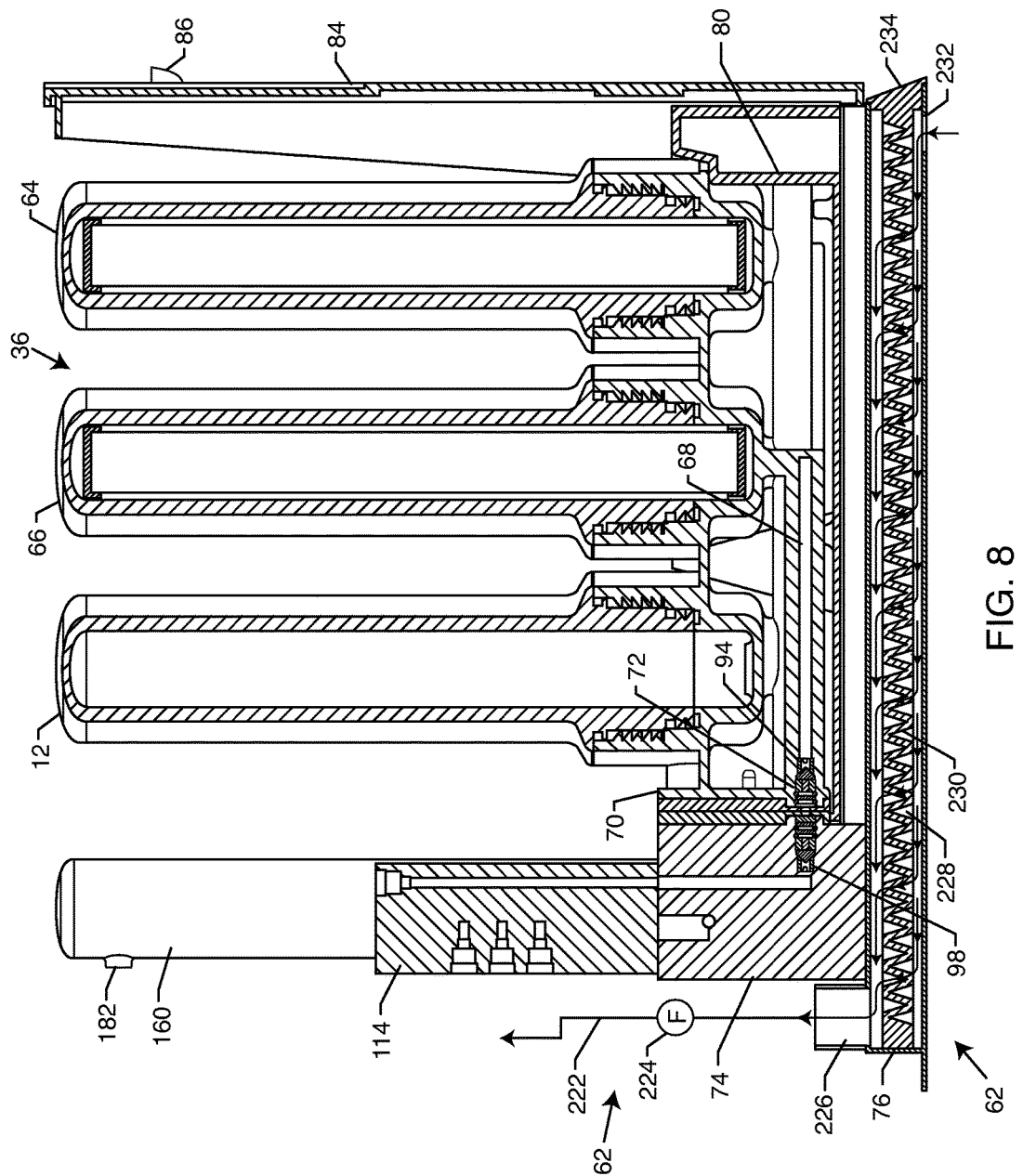
FIG. 8 is a vertical sectional view taken generally on the line 8-8 of FIG. 5.

With the multi-cartridge unit 36 seated within the open drawer 80, as viewed in FIG. 4, the drawer 80 can be closed by simple slide-in action to displace the ported manifold end plate 70 into fluid-coupled relation with the plurality of water conduit members 72 on the fixed manifold 74. The guide pins 71 are designed to engage reciprocal bores (not numbered) in the end plate 70 to correctly align the slidable manifold base 68 with the fixed manifold 74 such that engagement between the end plate 70 and the water conduit members 72 automatically functions to provide the correct fluid flow paths for proper operation of the reverse osmosis water purification system 10. Persons skilled in the art may recognize that other alignment mechanisms may be used in place of or in addition to the guide pins 71. FIG. 7 illustrates construction details of one exemplary and preferred coupling arrangement, wherein multiple ports 92 formed in the end plate 70 each include a check valve 94 spring-loaded to a normally closed position to prevent water leakage therefrom. Each of these check valves 94 is adapted for push-fit engagement and partial retraction by a probe 95 of the associated one of the water conduit members 72 which carries one or more seal rings 96 for slidably sealed engagement within the end plate port 92 prior to opening movement of the associated check valve 94. Similarly, each of the water conduit members 72 is mounted on the fixed manifold 74 for accommodating a short axial retraction stroke of the associated probe 95 upon registration with the check valve 94 of the associated end plate port 92, for displacing a second, normally closed spring-loaded check valve 98 (within the fixed manifold 74) to an open position. Accordingly, slide-fit coupling of the end plate ports 92 with the water conduit members 72 is accompanied by opening of the check valves 94, 98 to permit water flow, whereas slide-out separation of these components is accompanied by spring-loaded reclosure of the check valves 94, 98 to prevent water leakage. FIG. 8 shows the multi-cartridge unit 36 installed within the drawer 80, with the drawer 80 slidably advanced to the closed position for assembling the ported end plate 70 in flow-coupled relation with the water conduit members 72 of the fixed manifold 74.

Figure 9:
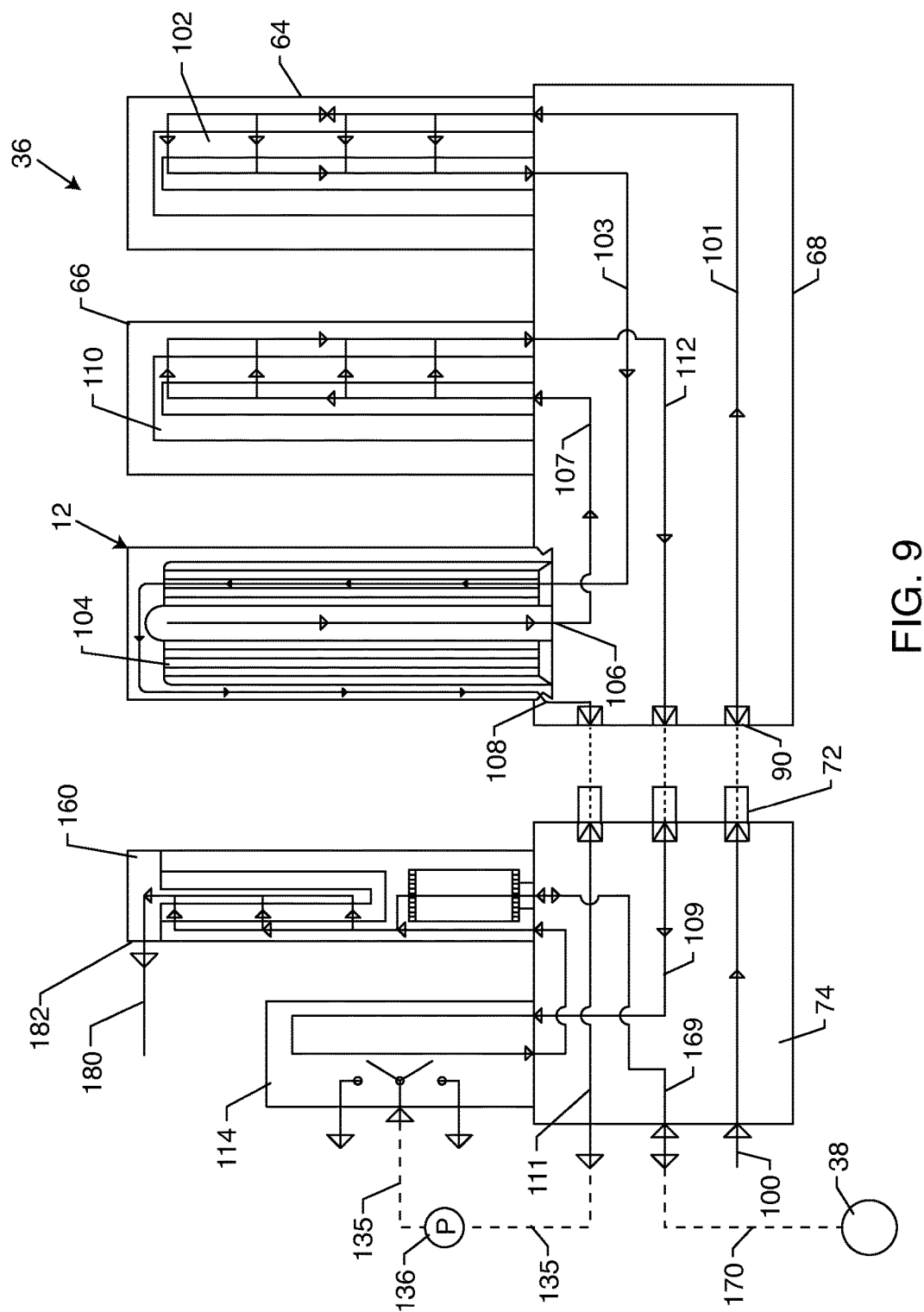
FIG. 9 is a schematic flow diagram indicating water flow through the manifold housing including the multi-cartridge unit removably installed therein.

With the multi-cartridge unit 36 installed into the manifold housing 62, with the cartridge manifold base 68 in flow-coupled relation with the fixed manifold 74, production of pure water proceeds in a normal manner. In this regard, as shown in somewhat schematic form in FIG. 9, the fixed manifold 74 receives the water outflow from the catalyst pre-filter 16, via a flow conduit 100 from the first lower outflow port 58 of the catalyst pre-filter 16 (see also FIG. 1). The fixed manifold 74 couples this pre-treated water flow to the cartridge manifold base 68 for initial flow to and through a flow path 101 to the pre-membrane filter cartridge 64. In the preferred form, this pre-membrane filter cartridge 64 includes a conventional carbon-based filtration media 102 such as granulated carbon for capturing residual contaminants that may be present in the otherwise pre-treated water inflow. From the pre-membrane filter cartridge 64, the manifold base 68 routes the filtered water flow via a flow path 103 to a tap water inflow port for supplying the water flow to the RO cartridge 12 having a conventional semipermeable RO membrane 104 therein. During pure water production, the RO membrane separates the water inflow into two water outflows, namely, relatively purified water coupled via a purified water outflow port to a first RO outlet flow path 106, and brine coupled via a brine outflow port to a second RO outlet flow path 108.

The produced relatively purified water 14 is coupled via the first RO outlet flow path 106 via a flow path 107 in the manifold base 68 to the post-membrane filter cartridge 66. The post-membrane filter cartridge 66 also includes a conventional carbon-based filtration media such as granulated carbon 110 for capturing residual contaminants in the pure water stream. From this post-membrane filter 66, the purified water 14 is coupled to a flow path 112 through the manifold base 68, and in parallel with the brine outflow at the second RO outlet flow path 108, to the fixed manifold 74. The fixed manifold 74, in turn, defines internal flow paths 109 and 111 for coupling the filtered pure water path 112 and the brine path 108 respectively to a control valve 114.

Figure 10:
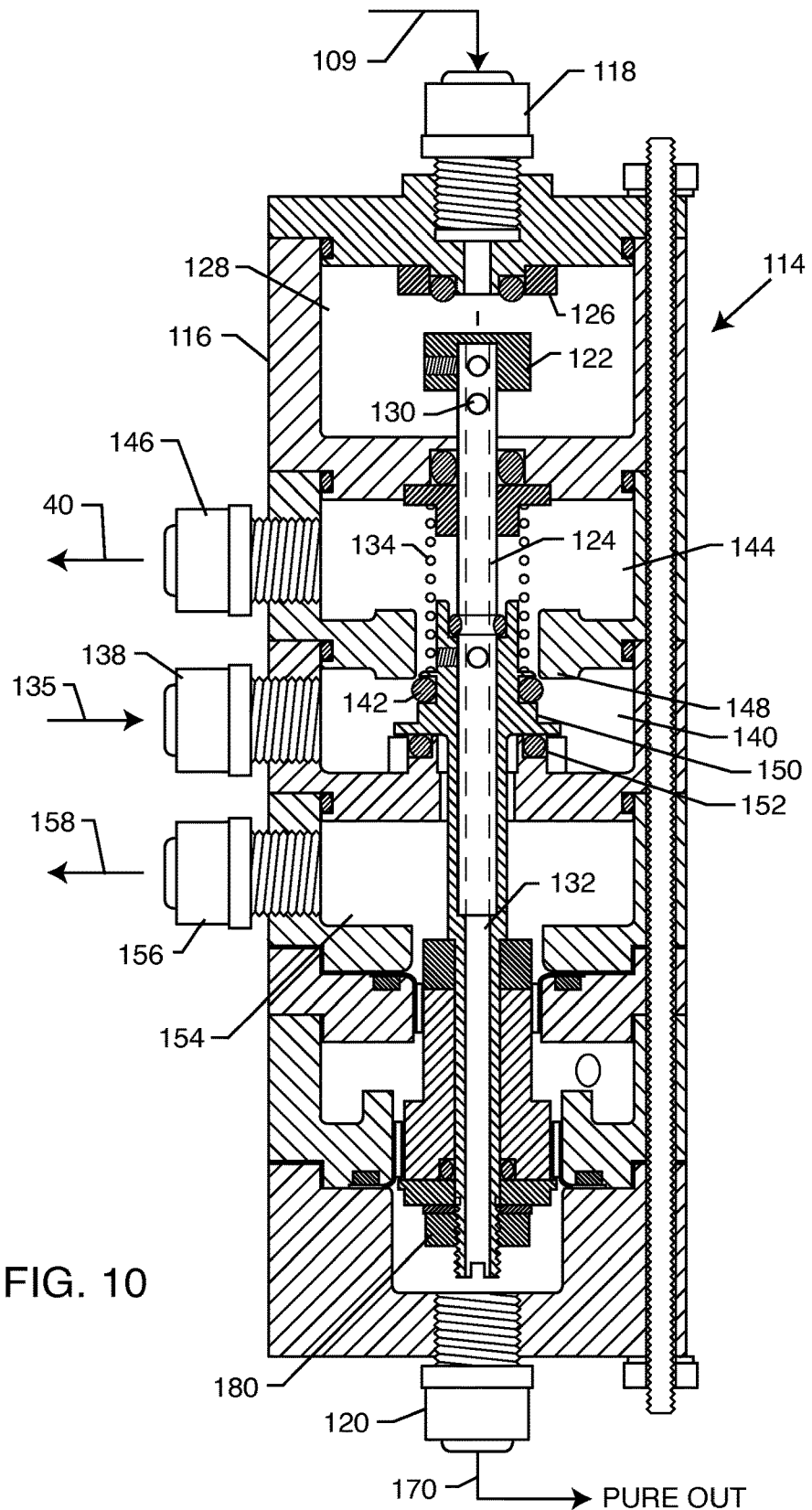
FIG. 10 is an enlarged vertical sectional view showing internal details of a control valve mounted within the manifold housing, wherein the illustrative control valve conforms with one preferred embodiment of the invention.
Figure 11:
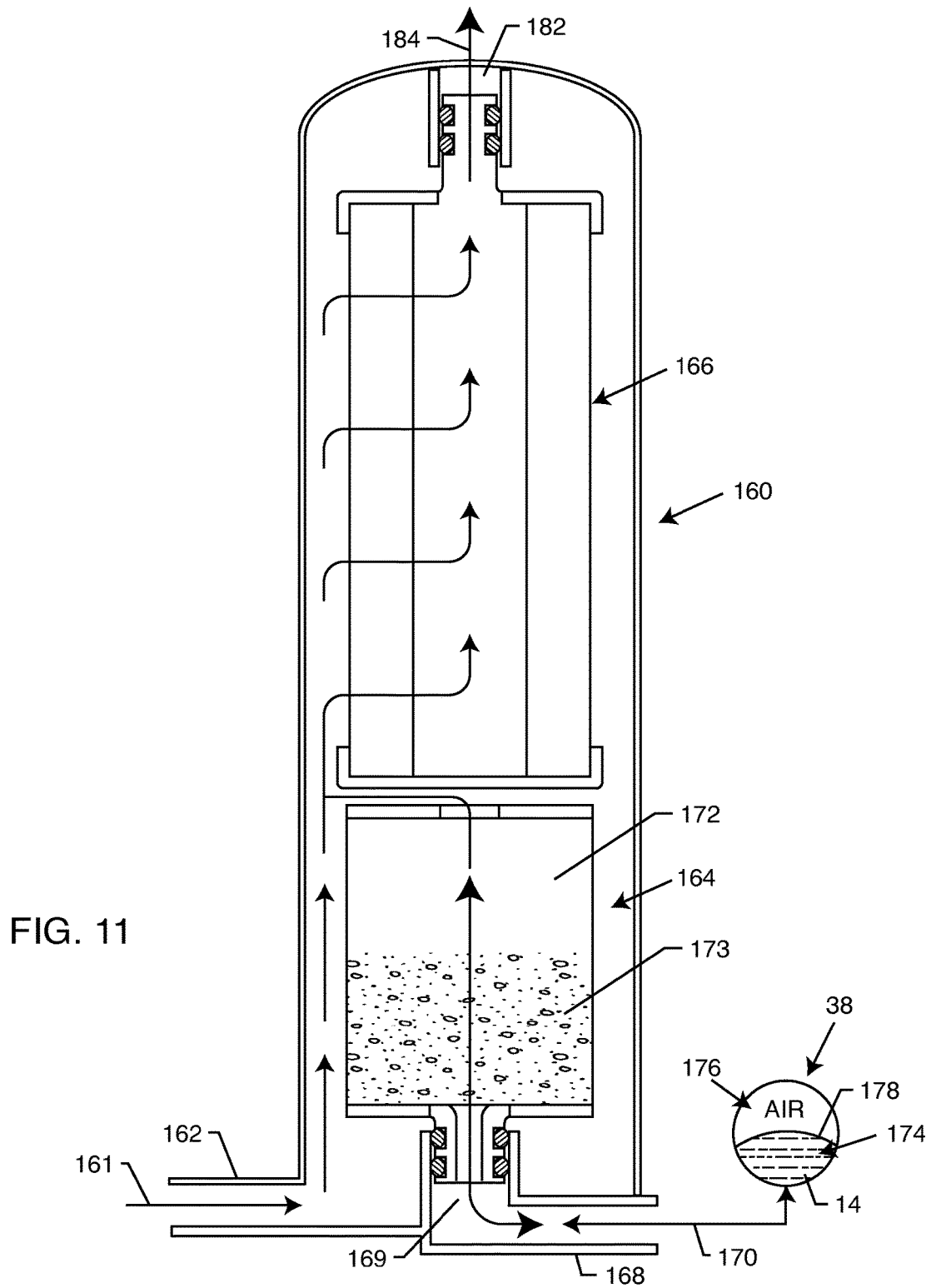
FIG. 11 is an enlarged vertical sectional view showing a final catalyst filter cartridge mounted within the manifold housing.

The control valve 114 is mounted on the fixed manifold 74 within the housing 62 for direct water-flow connection thereto. As shown in FIG. 10 in accordance with one preferred form, the control valve 114 comprises a multichambered valve housing 116 defining a pure water inflow port 118 and a pure water outflow port 120 at opposite ends thereof. The pure water inflow port 118 couples the purified and filtered water flow 14 via the flow path 109 for normal pressure-caused retraction of a seal stop 122 carried at one end of an elongated valve spool 124, thereby retracting the seal stop 122 from a seat 126 on the valve housing 116 and permitting pure water inflow into a first control valve chamber 128. Within this first control chamber 128, the pure water 14 flows past the seal stop 122 to a laterally open entry port 130 formed in the valve spool 124. The pure water 14 flows through this entry port 130 and into an elongated spool bore 132 for flow to the opposite end of the valve spool 124 and passage therefrom through the pure water outlet port 120 for dispensing and/or storage, as will be described in more detail.

The valve spool 124 is biased as by a spring 134 for normally advancing the seal stop 122 into engagement with the associated seat 126, in the absence of pure water production inflow via the pure water inflow port 118. Accordingly, when pure water is being produced, sufficient pressure at the inflow port 118 causes the seal stop 122 to retract from the seat and permit pure water inflow, as described. At the same time, brine outflow from the second RO outlet flow path 108 is delivered via the flow path 111 and a flow conduit 135 through a pump 136 (FIGS. 1 and 9) to a central inflow port 138 (FIG. 10) on the control valve 114 for entry into a central valve chamber 140. This brine inflow passes, during pure water production, upwardly past a now-open recycle valve 142 on the retracted valve spool 124 into an overlying recycle chamber 144 for flow further through an outflow port 146 and the recycle conduit 40 to the domestic hot water circuit 34 (FIG. 1).

Conversely, when pure water production is halted, such as when the reservoir 38 is filled to a predetermined volume (as will be described), the spool valve 124 advances the seal stop 122 into seated engagement with the associated seat 126. At the same time, the recycle valve 142 advances to engage and seat with a housing wall 148 separating the central chamber 140 from the overlying recycle outflow chamber 144 to prevent water flow from the central chamber 140 past said recycle valve 142. Such closure of the recycle valve 142 is accompanied by, or immediately followed by, opening movement of a recirculation valve 150 also carried by the valve spool 124 and associated with a valve seat 152 to permit water from the central chamber 140 to flow downwardly into an underlying recirculation chamber 154 from which the water flows outwardly via an outflow port 156 for recirculation via a recirculation flow conduit 158 to the catalyst pre-filter 16 (see also FIG. 1).

Accordingly, during normal production of pure water 14, the brine flow having the contaminants concentrated therein is continuously recycled via the pump 136 and control valve 114 through the recycle conduit 40 to the domestic hot water circuit 34. FIG. 1 shows the recycle conduit coupled into a hot water circuit conduit at a location near the hot water dispense faucet 26. Persons skilled in the art will recognize that alternative coupling locations may be used, such as by connecting the brine flow directly to the hot water heater tank 32. In either case, the brine flow is not wasted, but is instead combined with system hot water, with conventional and typically routine or regular hot water dispensing effectively precluding any substantial or undesirable build-up of contaminants in the hot water circuit or any back-leaching of those contaminants into the cold water circuit 30.

The produced pure water 14 flows from the control valve 114 to a post-treatment final catalyst filter cartridge 160 shown (in one preferred form) mounted on the fixed manifold 74 adjacent the control valve 114 (FIGS. 1,4-6, 8-9 and 11). This post-treatment cartridge 160, as shown best in FIG. 11, includes an inflow port 162 for pure water inflow from the control valve outlet port 120 and further through a flow path 161 in the fixed manifold 74, to a position between a lower catalyst filter element 164 and an upper carbon-type filter element 166. Assuming that the pure water dispense faucet 20 is in a normally closed position, the pure water flow passes downwardly through the lower catalyst filter element 164 and further through a flow port 168 and further through a manifold flow path 169 (FIG. 9) and a flow conduit 170 to the pure water storage reservoir 38. In the preferred form, the catalyst filter element 164 defines a filtration chamber 172 filled partially (preferably less than ½ the chamber volume) with a particulate catalyst media or agent 173 including zinc, such as the same copper-zinc catalyst material used in the prior-described catalyst pre-filter 16. A portion of the catalyst zinc will be dissolved into the pure water flow passing therethrough, for purposes of maintaining water and storage tank freshness.

The pure water storage reservoir 38 includes a lower water storage chamber 174 (FIGS. 1 and 11) separated from an upper closed air-filled pressure chamber 176 by a resilient diaphragm or bladder 178. As the pure water storage chamber 174 fills with the purified water 14, the bladder 178 deforms to reduce the volumetric size of the pressure chamber 176. As the pure water chamber 174 reaches a substantially filled condition, the pressure applied to the pure water chamber 174 by the air-filled pressure chamber 176 increases slowly to a maximum predetermined pressure level. When this maximum pressure level is reached, as denoted by a ratio between the downwardly exposed area of a diaphragm valve 180 at the lower end of the valve spool 124 (FIG. 10) on the control valve 114, versus the upwardly exposed area of the seal stop 122 at the upper end of the valve spool 124, the spool shifts upwardly within the control valve housing 116 to close the pure water inflow port 118 and thereby halt pure water production. In a typical RO system, these surface areas are designed to achieve closure of the seal stop 122, to halt pure water production, when the pressure within the pure water chamber 174 reaches about ⅔ the tap water line pressure.

As previously described, cessation of pure water production is accompanied by re-routing of the brine flow through the recycle conduit 40 from the hot water circuit 34 (during pure water production), and instead coupling the now-untreated water flow passing from the RO membrane and through the second RO outlet flow path 108 through the recirculation conduit 158 to the catalyst pre-filter 16, as by coupling to the catalyst pre-filter via an inlet fitting 183 (FIGS. 1, 2 and 2a) or the like. That is, when pure water production is halted, tap water is continuously recirculated through the catalyst pre-filter 16, the pre-membrane filter 64, and the RO membrane 12, in lieu of continuously cycling this flow to the hot water system. As a result, and in view of the fact that pure water production is normally halted for a substantial period of time each twenty-four hour period, the filtration load represented by untreated tap water is removed from these system components whenever pure water production is halted. Instead, these system components are subjected only to prior-treated water thereby further extending the operating service life thereof.

When pure water 14 is dispensed upon opening of the pure water dispense faucet 20, the pressure within the pure water chamber 174 of the storage reservoir 38 falls. When this occurs, the applied pressure to the diaphragm valve 180 at the lower end of the valve spool 124 (FIG. 10) drops, thereby opening the pure water inlet port 118 and permitting resumed production of purified water by the RO cartridge 12. Resumed pure water production is accompanied, of course, by re-directing the now-brine outflow from the second RO outlet path 108 from the catalyst pre-filter 16 back to the hot water circuit 34 via the recirculation conduit 40.

During dispensing, the pure water 14 back-flows from the storage reservoir 38 through the conduit 170 for passage back into contact with the catalyst media 173 within the final catalyst filter cartridge 160. In this regard, as shown best in FIG. 11, the pure water 14 up-flows through the particulate bed of the catalyst media 173, resulting in stirring and fluidizing of the media 173 sufficient to turbulently abrade and refresh the media 173 in the same manner as previously described with respect to the catalyst pre-filter 16. From the catalyst filter element 164, the pure water 14 combines with newly produced pure water 14 for flow together through the overlying carbon-based filter element 166 before discharge through an outflow port 182 and associated flow conduit 184 to the faucet 20 for dispensing.

When the pure water dispense faucet 20 is turned off, pure water dispensing is halted. But, pure water production will continue until the pure water chamber 174 of the storage reservoir 38 substantially re-fills. At that time, the pressure within the pure water chamber 174 rises sufficiently to shift the spool valve 124 back to a closed position halting pure water production, as previously described.

Figure 12:
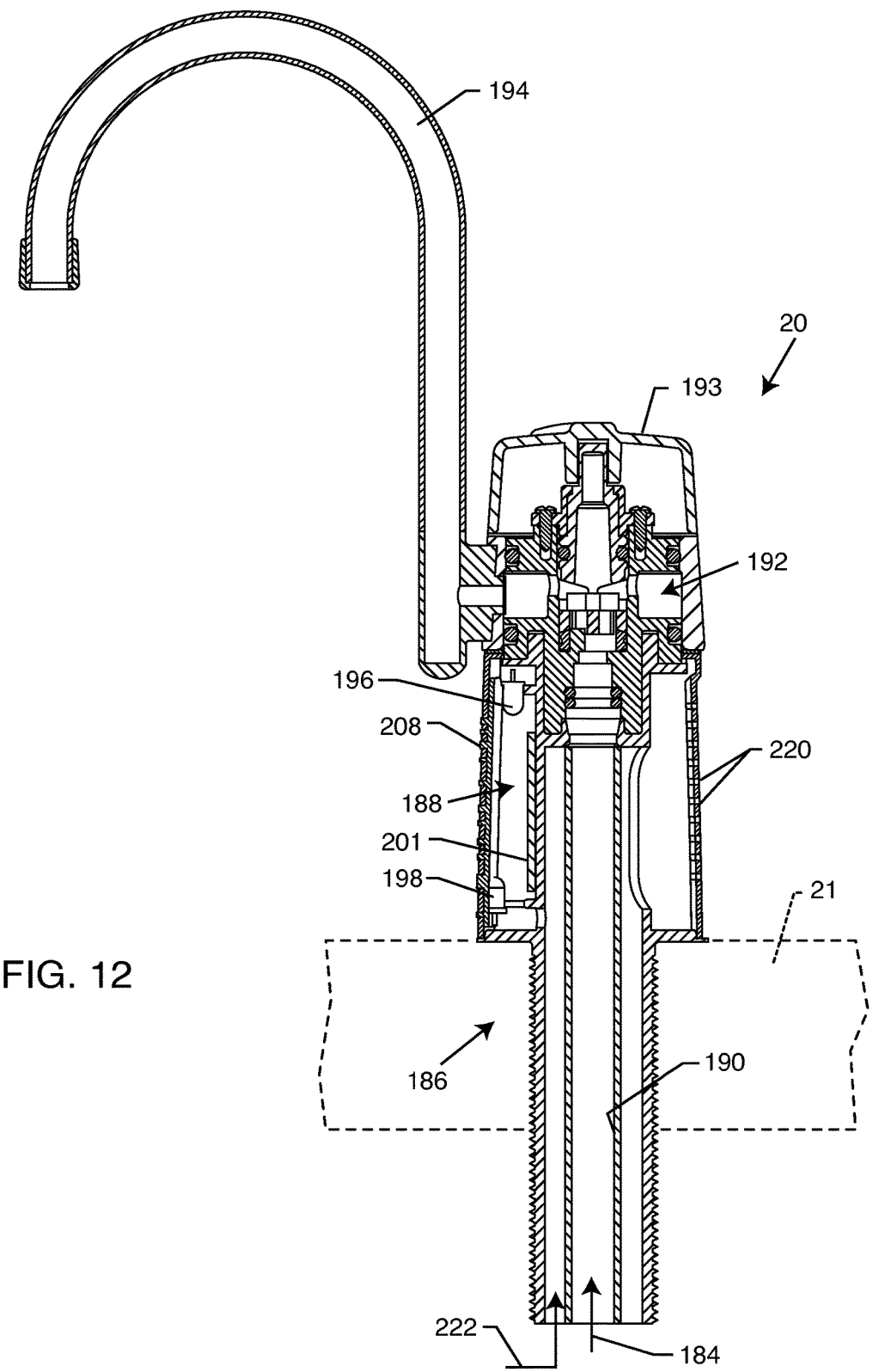
FIG. 12 is an enlarged vertical sectional view depicting a pure water dispense faucet for use in the invention.
Figure 13:
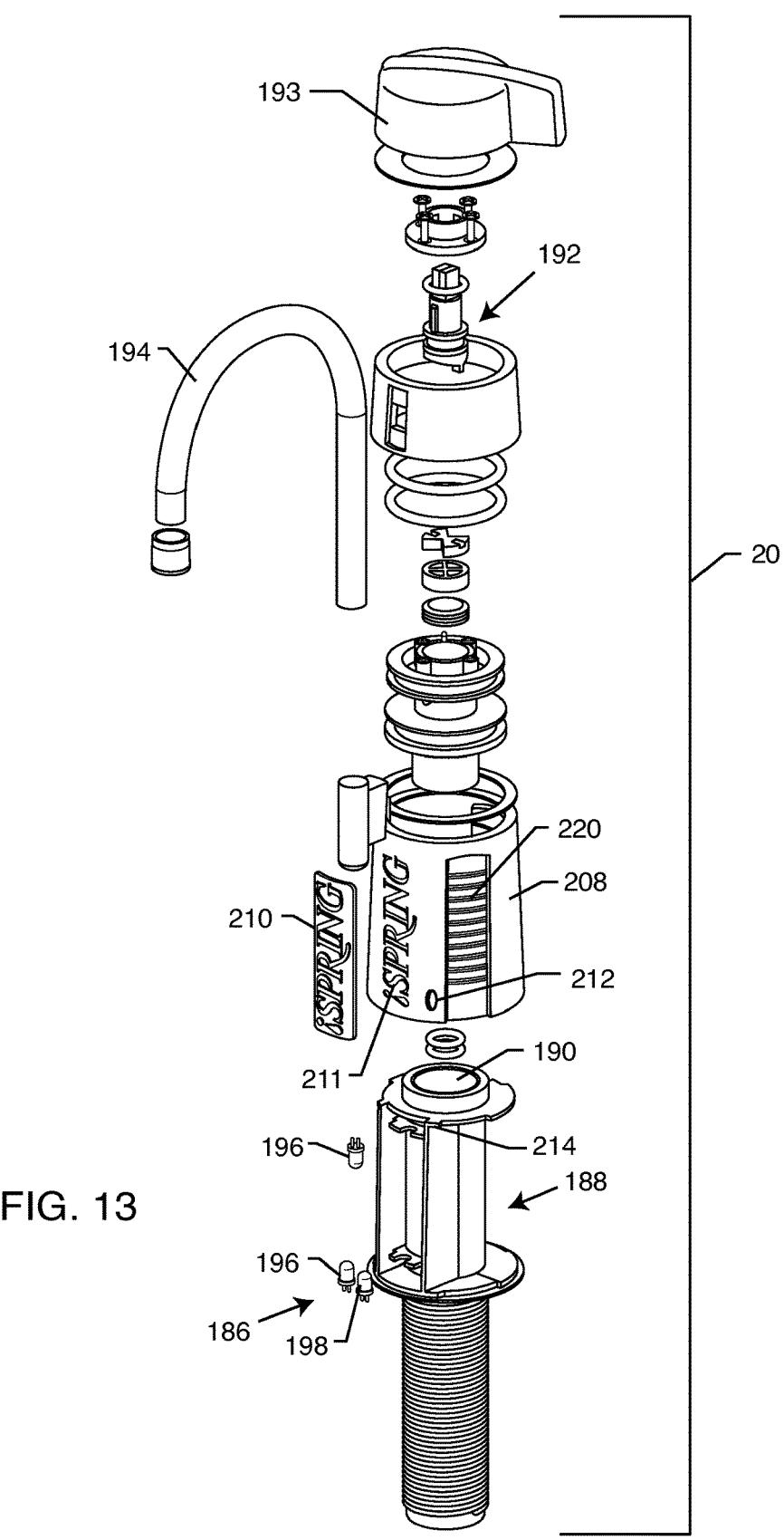
FIG. 13 is an exploded perspective view of the pure water dispense faucet of FIG. 12.
Figure 14:
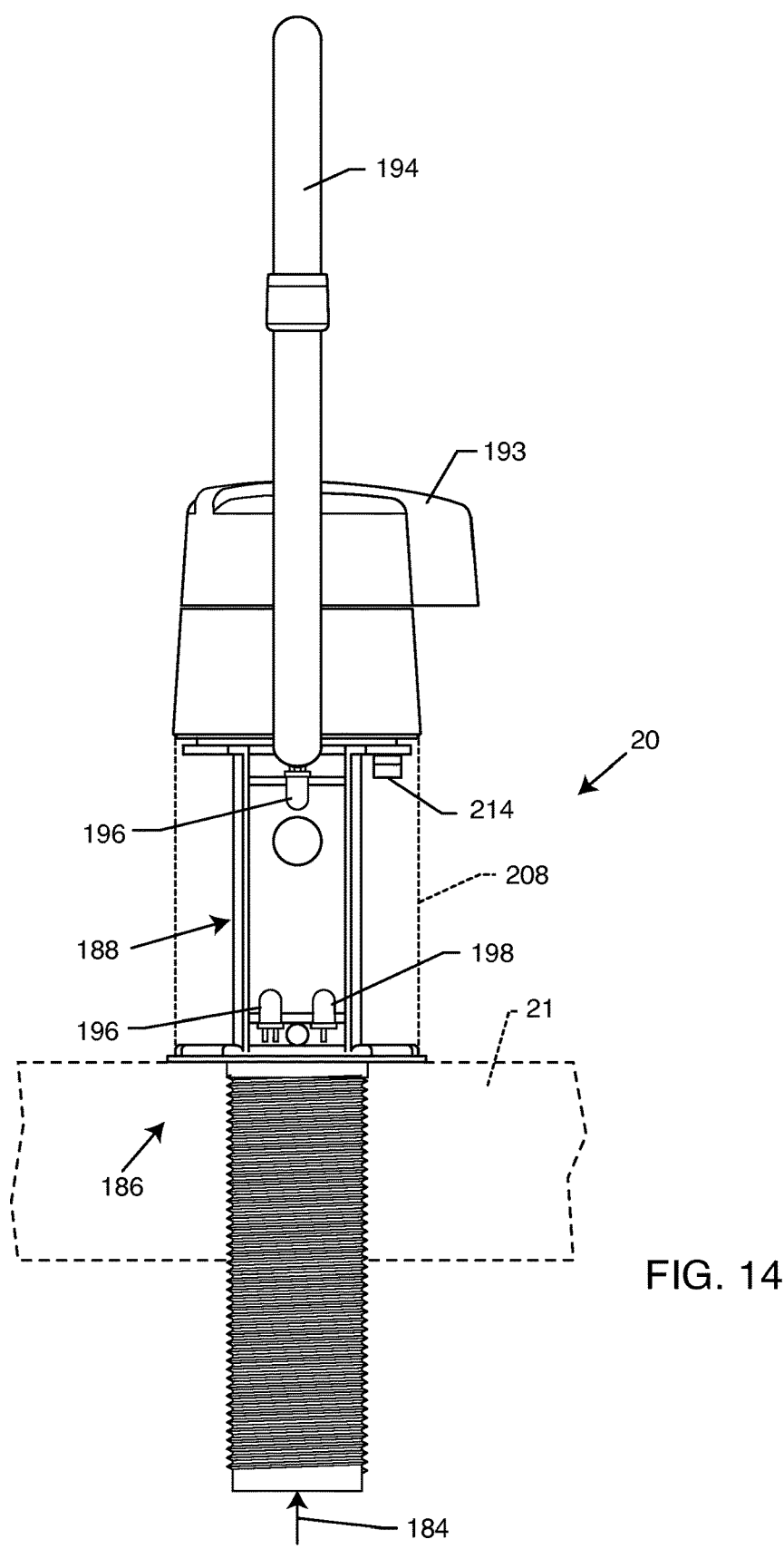
FIG. 14 is a front elevation view of the pure water dispense faucet of FIG. 12.

FIGS. 12-14 show the pure water dispense faucet 20 in more detail, in accordance with one preferred form of the invention. As shown, the pure water dispense faucet comprises a compact faucet body 186 having a threaded lower end adapted for conventional mounting through a sink-type countertop 21 (FIGS. 12 and 14) or the like. This faucet body 186 includes an upper portion 188 normally positioned above the countertop. The faucet body 186 further defines an internal flow path 190 coupling the pure water dispense conduit 184 through a manually operable faucet valve 192, operated by a rotatably mounted faucet handle 193, to an upwardly projecting dispense spout 194 of typically inverted, generally U-shaped configuration.

The upper portion 188 of the dispense faucet body 186 carries a plurality of indicator lights, such as the illustrative pair of vertically opposed lights 196 of common color (such as green or blue), and a third indicator light 198 of a different color (such as yellow or red). These indicator lights 196, 198 are shown best in FIGS. 13-14, and may comprise relatively low power LED-type lights provided to indicate water quality in response to conductivity readings taken regularly during system operation by a water quality monitor circuit 200, as depicted schematically in FIG. 15. This monitor circuit 200 is preferably incorporated into the faucet assembly, preferably on a circuit board 201 (FIG. 12) carrying the LED's 196, 198. Alternately, if desired, the monitor circuit 200 can be installed at any other convenient location such as on or within the manifold housing 62 located beneath the countertop 21. The monitor circuit 200 is powered by a suitable power source (not shown) such as a battery or a standard alternating current power supply.

More particularly, and in accordance with one preferred form of the invention, the monitor circuit 200 is coupled to and operates a pair of electrodes 202 and 204 for respectively taking conductivity readings of the untreated tap water inflow and the produced purified water 14. In this regard, these electrodes 202, 204 may be located at a variety of convenient positions along the various water flow paths in the purification system. Persons skilled in the art will understand that such conductivity readings are reflective of the presence of dissolved solids in the monitored water supplies, whereby a comparison between the conductivity of the untreated tap water versus the produced purified water represents an indication of the performance efficiency of the RO membrane. When the detected conductivity ratio indicates inadequate purification of the water, it is time to replace the RO cartridge 12. Such replacement, in the system disclosed herein, is anticipated on an infrequent basis, i.e., at about 5-7 year intervals.

Figure 15:
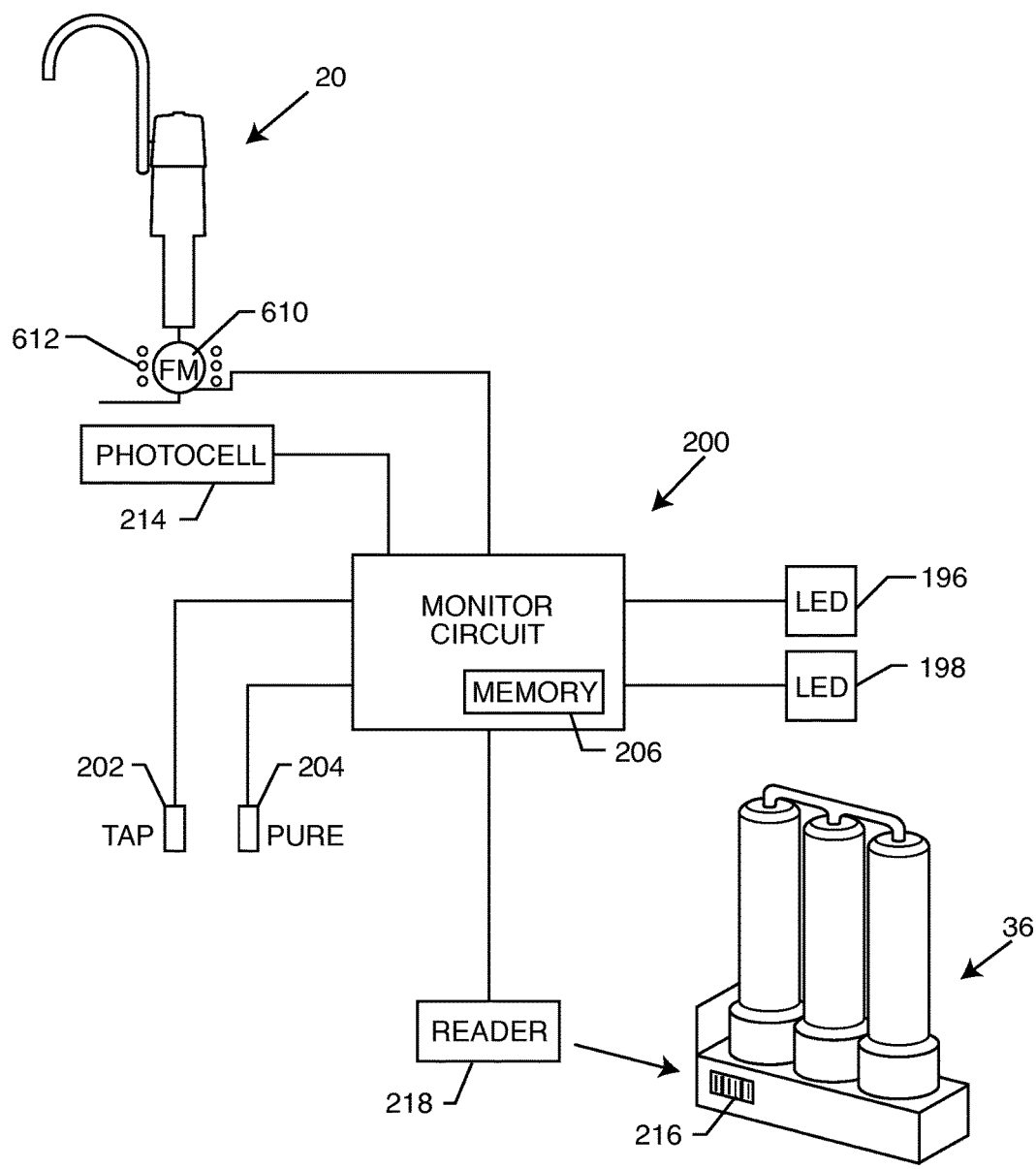
FIG. 15 is a schematic circuit diagram showing a conductivity monitor system and related control components.

The monitor circuit 200 is programmed to take conductivity readings following a predetermined time delay (such as about 5 minutes) after opening of the control valve 14 to initiate pure water production, and thereafter repeat such conductivity readings according to a programmed schedule (such as about every 5 minutes) following the predetermined time delay until the control valve 114 closes to halt pure water production. These conductivity readings are stored in a circuit memory 206 (FIG. 15). In the event that a predetermined consecutive number of conductivity readings (such as 5 consecutive readings) indicates poor water quality during any single pure water production cycle, i.e., that the RO cartridge 12 needs to be replaced, the monitor circuit 200 illuminates the yellow or red indicator light 198 in a continuous or continuously blinking fashion until RO cartridge replacement. In an alternative preferred form, the monitor circuit 200 is programmed for illuminating the lights 196 and 198 in an alternating blinking sequence until RO cartridge replacement. In the absence of the predetermined consecutive number of unsatisfactory readings during any single pure water production cycle, the monitor circuit 200 is programmed to automatically re-set upon closure of the control valve 114. The circuit 200 is also programmed to re-set in the event that the pure water production cycle is halted before the predetermined number of consecutive readings can be taken.

Otherwise, the monitor circuit 200 is programmed to illuminate the green or blue indicator lights 196 each time the pure water dispense faucet 20 is turned on to dispense water, as by response to a flow switch or the like (shown in FIG. 15 in the form of a flow meter 610, as will be described in more detail). As shown best in FIG. 13, an outer shroud 208 mounted about the upper portion 188 of the faucet body 186 carries a partially transparent or translucent brand name logo element 210 with raised logo elements shaped to fit snugly within a logo cutout 211 formed in the outer shroud 208. If desired, a clear or transparent seal such silicon putty (not shown) may be used to prevent accumulation of dirt and the like within small crevices between the cutout 211 and the raised logo on component 210. The color of the illuminated indicator lights 196 or 198 backlight and are thus visible externally via this transparent or translucent logo element 210. Alternately, if desired, the transparent or translucent logo element 210 may be positioned in front of the green or blue indicator lights 196, with a separate port 212 (FIG. 13) of the like positioned in front of the yellow or green indicator light 198.

In accordance with a further aspect of the invention, the upper portion 188 of the dispense faucet body 186 may additionally carry a photocell 214 (FIG. 14) for detecting the level of ambient light. The photocell 214 is integrated into the monitor circuit 200 (FIG. 15) for illuminating one or both of the indicator lights 196, or a different indicator light (not shown), when the ambient light level falls. Accordingly, the photocell 214 effectively causes indicator light energization to provide a night-light function. In the preferred form, the circuit 200 (FIG. 15) responds to the photocell 214 to illuminate only one of the two indicator lights 196, or to illuminate both lights 196 at a reduced power level, thereby providing a relatively dim yet effective night-light function.

When the monitor circuit 200 illuminates the indicator light 198 to indicate unsatisfactory RO system performance, it is necessary to replace the RO cartridge 12. This is accomplished by removal and replacement of the multi-cartridge unit 36. In this regard, illumination of the indicator light 198 requires a replacement multi-cartridge unit 36 to be ordered and received. As previously shown and described herein, the slide-out drawer 80 is opened to accommodate quick and easy lift-out removal of the old multi-cartridge unit 36, followed by similarly quick and easy drop-in installation of the replacement unit 36 and re-closure of the drawer 80 (FIGS. 4-6). Such removal and replacement of the multi-cartridge unit 36 does not require service personnel to visit the purification system site.

In addition, the dispense faucet 20 may carry or otherwise be associated with a flow meter 610 (shown schematically in FIG. 15) for monitoring the total amount of purified water dispensed by the faucet 20 over a period of time. This flow meter 610 is adapted to generate a signal each time the faucet 20 is opened to dispense purified water, wherein this signal is proportional to the water flow rate. Accordingly, the flow meter 610 also functions as a flow switch, in the preferred form, for signaling the monitor circuit 200 to energize the lights 196 each time the faucet 20 is opened to dispense water. This flow rate signal is coupled to the monitor circuit 200 (FIG. 15) which responds thereto by maintaining in memory a record indicative of the total or cumulative volume or gallonage of water dispensed. Over a period of time, when the total water volume dispensed equals or exceeds the capacity of the carbon-based system filter elements to remove contaminants from the processed water, the monitor circuit 200 is programmed to provide an indication that the multi-cartridge unit 36 needs to be changed. Such indication may be similar to the indication provided when the conductivity readings (as described above) indicate unsatisfactory RO membrane performance, i.e., the monitor circuit 200 may energize the indicator light 198 to indicate a need to replace the multi-cartridge unit 36.

While the flow meter 610 may take various forms, one preferred flow meter construction corresponds generally with the flow meters marketed by Blue-White Industries, Ltd., of Huntington Beach, Calif. under the model designations F-440 series. Such flow meters generally comprise a core float member formed from a magnetic-type stainless steel or the like captured within a tapered housing disposed in-line with the dispense faucet flow path 190 (FIG. 12) for displacement along said tapered housing by an increment proportional to the water flow rate therethrough. By surrounding such flow meter 610 with a conductive coil 612 (FIG. 15), an electric signal is generated proportional to the water flow rate, wherein this proportional electric signal is coupled to the monitor circuit 200. In this arrangement, it is desirable to position the monitor circuit 200 relatively close to the flow meter 610, as by incorporating the monitor circuit 200 within the faucet assembly on the circuit board 201 (FIG. 12), to facilitate accurate flow meter calibration and operation. Persons skilled in the art will appreciate that alternative flow meter constructions may be used.

To insure proper re-setting of the monitor circuit 200 following replacement of the multi-cartridge unit 36, each unit 36 is provided with a unique marking or other suitable identification means such as a unique bar code label 216 or the like (FIGS. 6 and 15). This label 216 is positioned to be scanned optically by an optical reader 218 (FIG. 15), such as a bar code reader, mounted on or near the internal base 76 of the manifold housing 62. This reader 218 is connected to a re-set portion of the monitor circuit 200 which includes in its memory the unique code associated with the prior multi-cartridge unit 36 stored previously therein. In the event that the prior multi-cartridge unit 36 is simply removed from and then re-installed into the slide drawer 80, the reader 218 will read and recognize the same code and thereby not function to re-set the monitor circuit 200. Instead, the reader 218 requires a new and different code to be scanned, in order to re-set the monitor circuit 200. Upon such re-set, the monitor circuit 200 is programmed to retain the new cartridge code 216 in its memory, pending subsequent removal of the newly installed cartridge for replacement by still another multi-cartridge unit having still another different code 216.

Persons skilled in the art will appreciate that alternative identification means and associated reader means may be employed, including but not limited to radio frequency identification devices (RFID) and the like. Persons skilled in the art will also recognize that the unique code 216 associated with a newly installed or replacement multi-cartridge unit 36 may also include means for re-programming the monitor circuit, e.g., as by modifying the cumulative dispensed gallonage required to signal that it is time to replace the unit 36. In this manner, the monitor circuit 200 can be re-programmed as needed to accommodate local water supply conditions, new technology developments, and the like—all without requiring direct user intervention and/or any on-site visits by service technicians.

In accordance with a further aspect of the invention, the pure water dispense faucet 20 is adapted for receiving and distributing a flow of filtered or purified air into the room in which the faucet 20 is located. In this regard, the shroud 208 on the upper portion 188 of the faucet body 186 includes an array of vent ports 220 (FIGS. 12-13) coupled to an air flow conduit 222 (FIG. 12) passing upwardly through the faucet body 186. This air flow conduit 222 has an upstream end coupled to a fan 224 (FIGS. 1 and 8) mounted on or near the internal base 76 of the manifold housing 62. The fan 224 draws ambient air from a small plenum box 226 which is linked in turn to a downstream end of a filter chamber 228 (FIG. 8) having an air filter element 230 mounted therein. This filter chamber 228 occupies a substantial portion of a hollow internal volume of the fixed manifold base 76, and communicates with at least one air inflow port 232. A hinged door 234 or the like at the front of the internal base 76, below the slide-out drawer 80, permits access to the air filter chamber 228 for removal and replacement of the filter element 230 on a periodic or as-needed basis.

Figure 16:
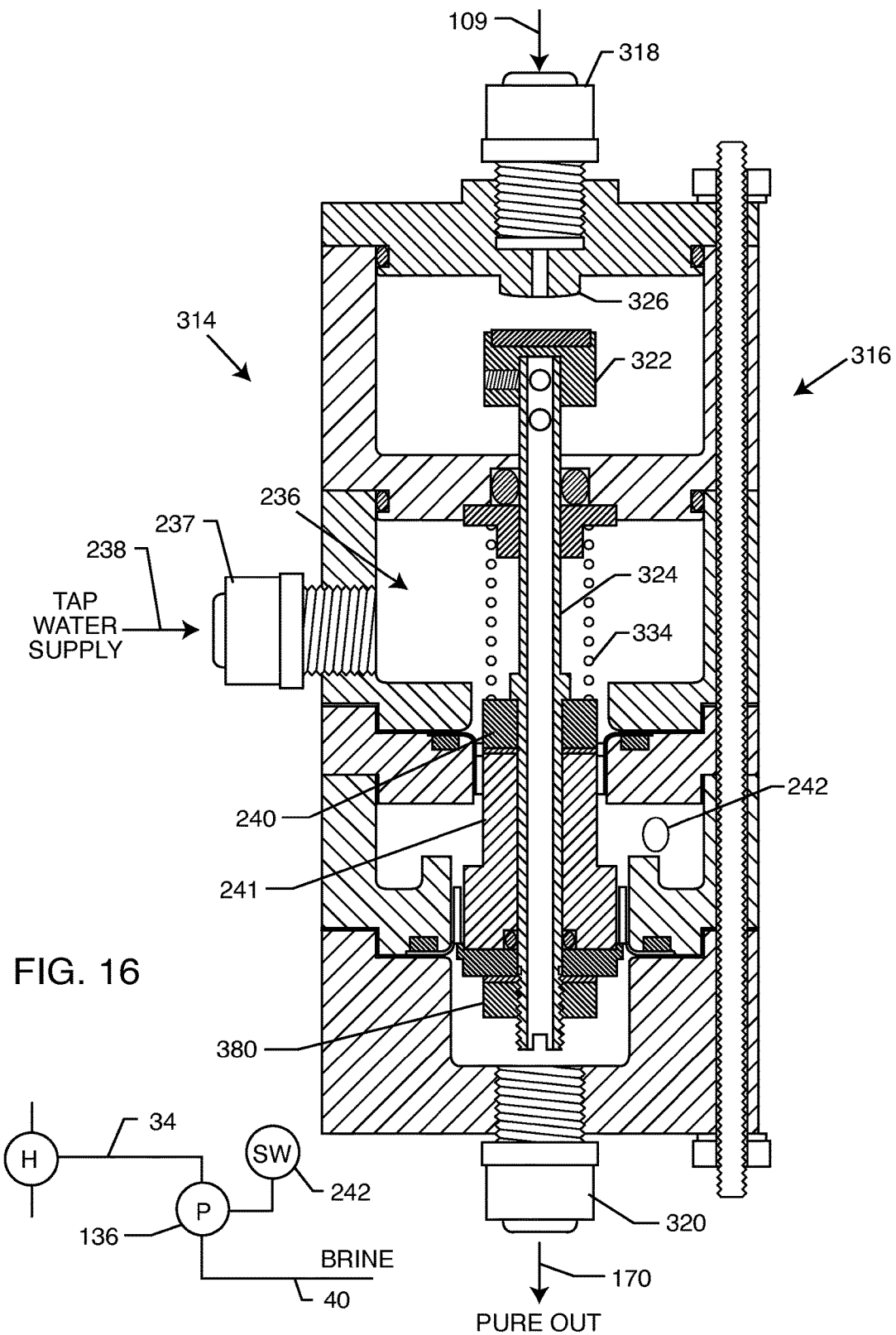
FIG. 16 is an enlarged vertical sectional view showing an alternative control valve constructed in accordance with one alternative preferred embodiment of the invention, and showing the control valve in relation to a portion of the system plumbing circuit.

FIG. 16 shows a modified control valve 314 constructed in accordance with an alternative preferred form of the invention, for use in lieu of the control valve 114 shown in FIG. 10, and wherein components corresponding in structure or function with those shown and described in connection with the control valve 114 are identified by common reference numerals increased by 200. As shown, the modified control valve 314 includes an elongated valve body or housing 316 defining a pure water inlet port 318 and a pure water outlet port 320 at opposed ends thereof. An elongated valve spool 324 extends generally between these inlet and outlet ports 318, 320, with a seal stop 322 movable relative to an associated seat 326 for opening to permit pure water production, and for closing to halt pure water production. A spring 334 biases the valve spool 324 toward a normal position halting pure water production.

The modified control valve 314 defines a central control chamber 236 coupled via a fitting 237 to the tap water supply, as by means of a flow conduit 238 or the like. A control valve 240 on the valve spool 324 responds to the water pressure within the control chamber 236 for applying a downward force to the valve spool 324. This downward force via the control valve 240 cooperates with backpressure applied to a lower diaphragm valve 380 to regulate opening and closing movement of the valve spool 324. Again, in a preferred arrangement, the seal stop 322 is designed to close when the pressure within a pure water storage reservoir 38 is about ⅔ the tap water line pressure.

The valve spool 324 is adapted to operate a switch 242, such as a conventional magnetically actuated reed-type switch, for controlling operation of the pump 136 used to recycle the brine flow to the hot water circuit 34. In this regard, the valve spool 324 may carry a magnetic element 241 in operative association with a reed-type switch 242. When pure water production is started, upon opening of the control valve 314, the switch 242 activates the pump 136 for recycling the brine to the hot water system 34, as previously described. When the control valve 314 closes, the pump 136 is de-activated and water is not recirculated through the RO membrane. Instead, the modified control valve 314 halts water circulation to and through the RO cartridge.

Figure 17:
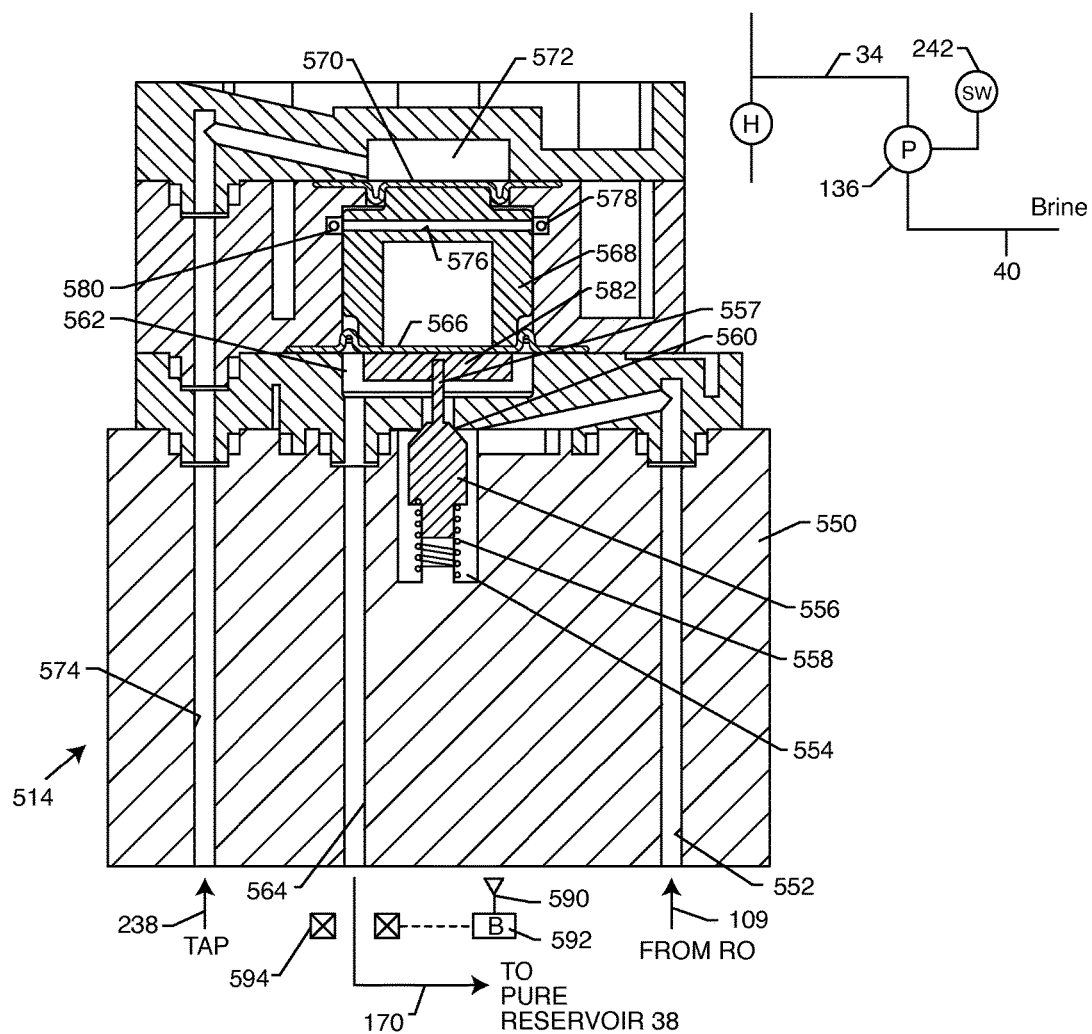
FIG. 17 is an enlarged vertical sectional view showing a further alternative form of a control valve constructed in accordance with the invention, and showing the modified control valve in relation to a portion of the plumbing system.

FIG. 17 shows a further modified control valve 514 constructed in accordance with a further modified preferred form of the invention. As shown, the control valve 514 has a simplified construction wherein flow ports and the like through moving diaphragm components are not required.

More particularly, the modified control valve 514 includes a multi-segmented valve body 550 having a first pressure port 552 coupled to receive produced purified water from the flow line 109 to a lower chamber 554 containing a valve head 556 normally biased by a spring 558 into sealed engagement with a valve seat 560. The valve seat 560 defines a short flow passage leading from the lower chamber 554 to a lower control chamber 562 which in turn communicates with a second pressure port 564 coupled for pure water flow to the storage reservoir 38 (as previously shown and described herein). One wall of the lower control chamber 562 is defined by a resilient diaphragm 566 carried at a lower end of a rigid member 568. A second and somewhat smaller-area resilient diaphragm 570 is carried at an upper end of this rigid member 568 and defines one wall of an upper control chamber 572 in flow communication with a third pressure port 574 coupled with the tap water inflow line 238.

The rigid valve member 568 carrying the lower and upper diaphragms 566, 570 of differential area size is designed to operate the switch 242 used to turn the pump 136 off and on in response to the filled or unfilled state of the pure water storage reservoir 38, as previously shown and described with respect to FIG. 16. In one form, the member 568 may comprise a magnetic element used to operate a reed-type switch 242 as described in FIG. 16. In another preferred form, the member 568 may incorporate a laterally open port 576 associated with an emitter 578 and a detector 580 mounted on the housing 550 at opposite ends of the port 576. This emitter-detector combination 578, 580 is coupled to the monitor circuit 200 (FIG. 15) for response to shifting displacement of the member 568 to turn the pump 136 on and off.

More particularly, when the pure water storage reservoir reaches a substantially filled condition, the hydraulic pressure rises in the storage reservoir 38 to increase the pressure along the line 170 and within the lower control chamber 562 applied to the lower diaphragm 566. This hydraulic pressure combines with the force applied by the spring 558 to overcome the downward force attributable to the tap water pressure within the upper control chamber 572, thereby shifting the valve head 556 to a closed position against the valve seat 560, and further thereby halting further pure water flow through the control valve 514 to the reservoir 38. At the same time, an upwardly protruding pin 557 on the valve head 556 engages a support plate 582 mounted centrally on the lower diaphragm 566 to shift the rigid valve member 568 upwardly to move the transverse port 576 into alignment with the emitter-detector combination 578, 580. When such alignment occurs, the monitor circuit 200 is signaled to turn the pump 136 off. Thereafter, upon dispensing of sufficient pure water from the reservoir 38, the hydraulic pressure applied to the lower control chamber 562 is sufficiently reduced (relative to the tap water pressure within the upper control chamber 572) to cause the rigid valve member 568 to shift downwardly in a manner to re-open the valve head 556 to permit resumed pure water production. Such downward shifting of the rigid valve member 568 is accompanied by misalignment of the emitter-detector combination 578, 580 with the transverse port 576, thereby signaling the monitor circuit 200 to re-activate the pump 136.

In accordance with a further aspect of the invention, and as shown by way of example in FIG. 17, the system may further include a remote means for disabling pure water production in the event that the user (i.e., a homeowner or business customer) fails to maintain a current or paid-up account with the system vendor. In this regard, FIG. 17 shows an antenna 590 carried by a telephonic reception device 592, such as a conventional beeper device, linked to a disable valve 594 such as a latching solenoid valve incorporated into the system plumbing lines, such as along the flow path 170 for pure water flow to the reservoir 38. In the event that the customer fails to maintain current account payments, the vendor can remotely signal the reception device 592 to operate the disable valve 594, directly or indirectly, by appropriate signaling to the monitor circuit 200, to close the pure water flow path 170. Such closure of the disable valve 594 effectively precludes further use of the system by the customer, and provides a clear indication that the customer's account needs to be brought up to date. Upon receipt of an appropriate payment, the vendor can remotely reactivate the system by signaling the reception device 592 to re-open the disable valve 594. In this regard, each system reception device 592 is associated with a unique telephonic address or code.

When the disable valve 594 is closed, the monitor circuit 200 may be programmed to respond by illuminating the light 198 for further providing the customer with a clear indication that the system 10 is not functioning properly. Upon remote re-signaling to re-start the system, the light 196 on the faucet valve 192 can be illuminated, as by blinking for a predetermined number of cycles, to indicate to the customer that system operation has been reactivated. In addition, during normal operation, the memory circuit 200 can be programmed to deliver "open" signals to the disable valve 594 at repeated intervals to safeguard against undesired or unexpected system shut-down due to valve closure. The disable valve 594 comprises, in the preferred form, a normally closed valve whereby the valve 594 automatically closes upon an interruption of the household power supply, but is automatically re-opened by the regular "open" signals upon resumption of the household power supply.

While the remote disabling means is shown and described for use with the modified control valve 514 shown in FIG. 17, persons skilled in the art will appreciate that the remote disabling means may be employed in any or all embodiments of the invention disclosed herein.

Figure 18:
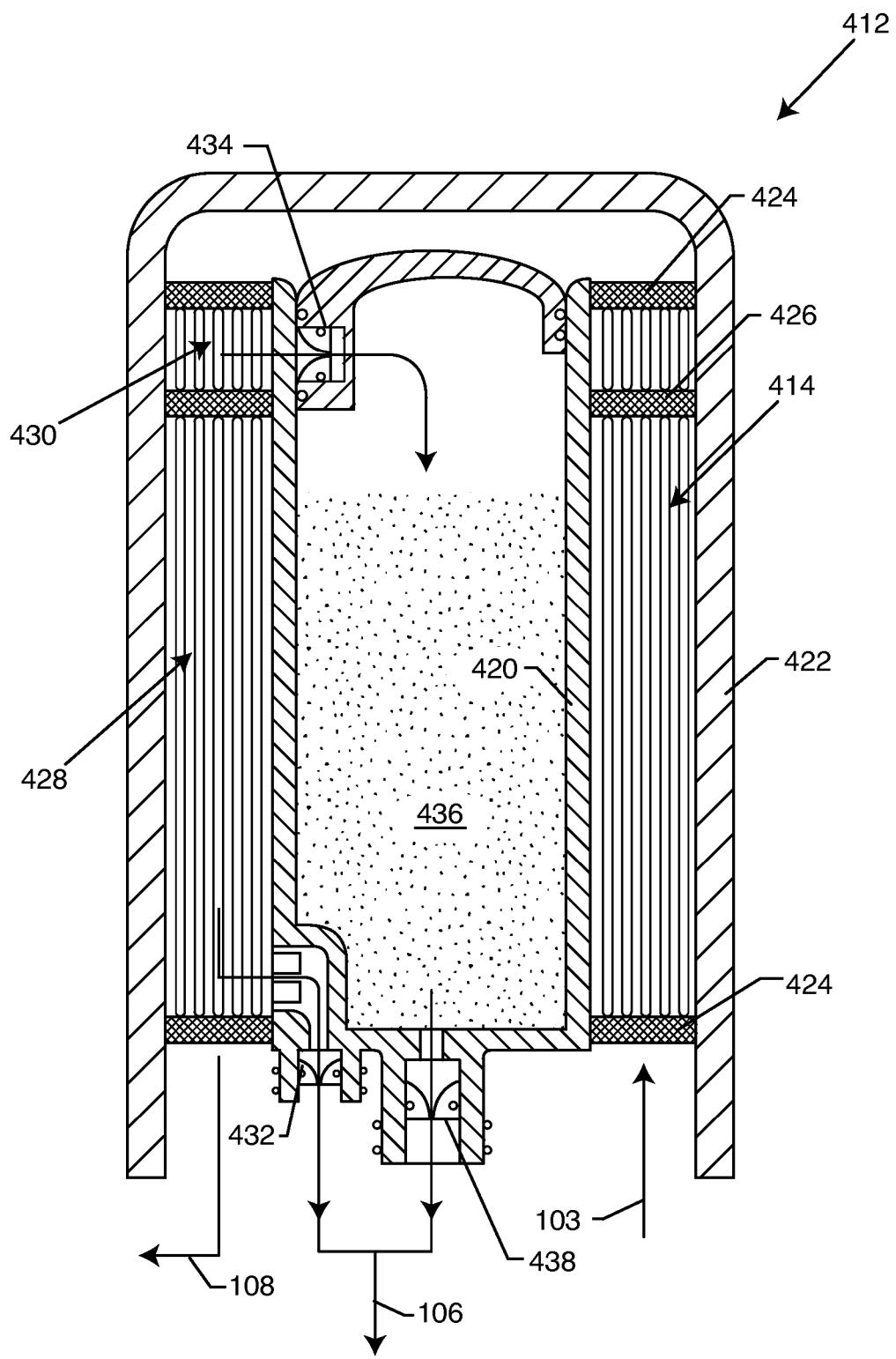
FIG. 18 is an enlarged vertical sectional view, in somewhat schematic form, depicting a reverse osmosis cartridge including means for adding one or more selected minerals to produced purified water, in accordance with one alternative preferred form of the invention.
Figure 19:
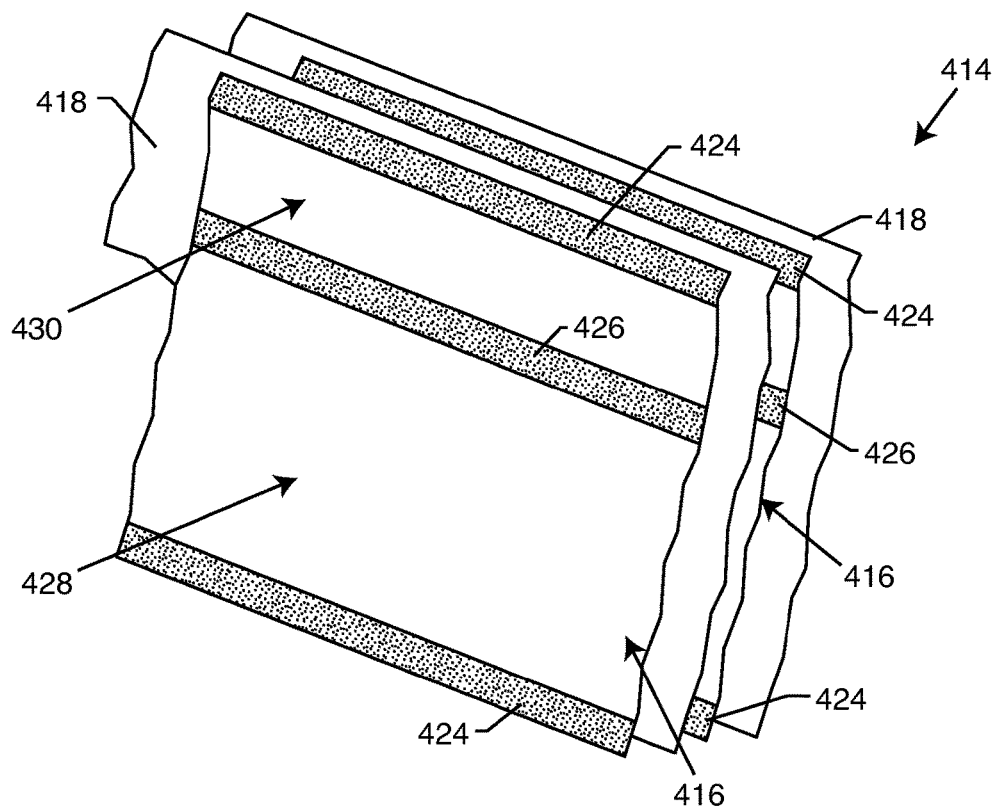
FIG. 19 is an enlarged exploded and fragmented perspective view showing a modified reverse osmosis membrane assembly for use in the modified reverse osmosis cartridge of FIG. 18.

FIGS. 18-19 illustrate a modified reverse osmosis cartridge 412, wherein the modified RO cartridge 412 can be used in lieu of the RO cartridge 12 depicted in FIGS. 1, 4-6, and 8-9. This modified RO cartridge 412 provides a relatively simple yet effective means for injecting or adding one or more selected minerals in dissolved form, such as calcium and/or magnesium and others, to the produced purified water.

As shown in FIG. 18, the flow path 103 provides tap or cold water inflow to the modified RO cartridge 412, in the same manner as previously shown and described herein. An RO membrane assembly 414 and related cartridge housing components are modified to accommodate mineral addition to the produced purified water. More particularly, the RO membrane assembly 414 (shown best in FIG. 19 in partially exploded form) comprises a conventional multiply wrap of a semi-permeable membrane material 416 in combination with intervening plies of a porous wick material 418. These plies 416, 418 are wrapped about a central support tube 420 (FIG. 18), and the resultant subassembly is fitted in turn within a hollow cartridge housing 422. As is known in the art, the opposite ends (upper and lower, in FIGS. 18 and 19) of the semi-permeable membrane material 416 include impermeable welds 424. The modified RO membrane assembly 414 additionally includes an intermediate weld 426 disposed in spaced relation with the upper weld 424. Accordingly, the intermediate weld 426 cooperates with the lower and upper welds 424 to subdivide the semi-permeable membrane material 416 into a first or lower filtration region 428 and a second or upper filtration region 430.

The tap or cold water inflow is flow-coupled via the flow path 103 to a lower end of the wrapped plies 416, 418 (FIG. 18). This water inflow passes along the wick material 418 between the lower end weld 424 to communicate with the first or lower filtration region 428. As is known in the art, the semi-permeable membrane material constituting this first filtration region 428 converts the water inflow into relatively purified water communicated radially with the pure water outlet path 106, and a brine flow communicated axially with the brine outlet path 108. In the modified RO cartridge 412, a portion of the water inflow proceeds further upwardly along the wick material 418 past the intermediate weld 426 to the second or upper filtration region 430 which produces an additional or secondary pure water flow. In the preferred configuration, the membrane surface area defined by the second filtration region 430 is considerably less than the membrane surface area defined by the first or primary filtration region 428.

As viewed in FIG. 18, the purified water produced by the primary filtration region 428 flows through a check valve 432, such as a duckbill-type check valve, to the pure water outflow line 106. By contrast, the purified water produced by the upper or secondary filtration region 430 passes through a small check valve 434 (such as a duckbill-type valve) into the hollow interior of the central support tube 420 which is filled at least partially with one or more water soluble mineral agents 436, such as calcium and/or magnesium in particulate form. This smaller flow of produced purified water thus dissolves and entrains the mineral agents 436 for outflow via another check valve 438 (such as a duckbill-type valve) to the pure water outlet flow path 106.

Accordingly, during pure water production, the modified RO cartridge 412 provides a means for injecting one or more desirable mineral agents into the purified water produced by the system. When pure water production is halted, such as when the associated pure water storage reservoir reaches a substantially filled condition (as previously shown and described herein), the check valves 434 and 438 at opposite ends of the mineral-containing chamber are closed to correspondingly halt the mineral injection process.

Figure 20:
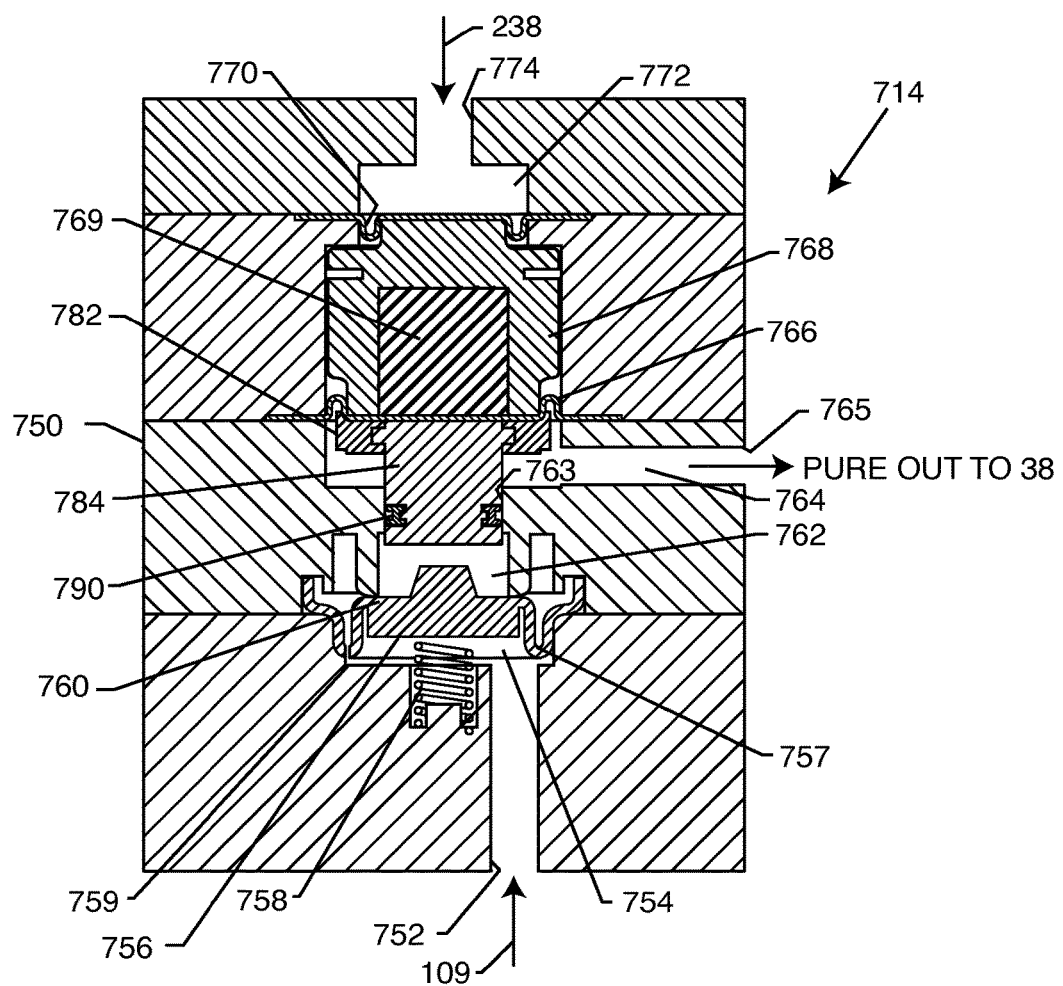
FIG. 20 is an enlarged vertical sectional view showing, somewhat in schematic form, a further alternative control valve constructed in accordance with one further alternative preferred embodiment of the invention.

FIG. 20 depicts still another alternative preferred form for a control valve 714, wherein this modified control valve 714 includes redundant closure mechanisms to positively insure cessation of water flow through the RO cartridge 12 when the pure water reservoir 38 reaches a substantially filled condition.

More particularly, the modified control valve 714 includes a multi-segmented valve body 750 having a first pressure port 752 coupled to receive produced purified water from the flow line 109 to a lower inlet chamber 754. A valve head 756 is positioned within this lower inlet chamber 754 and is normally biased by a spring 758 in an upward direction toward sealed engagement with an overlying valve seat 760. The valve head 756 is carried centrally by a resilient diaphragm 757 having a peripheral array of flow ports 759 formed therein.

The valve seat 760 defines a short flow passage leading from the lower inlet chamber 754 upwardly into a lower control chamber 762 which in turn communicates via a tapered valve seat port or bore 763 with an overlying secondary chamber 764 coupled via a second pressure port 765 with the flow line 170 for pure water flow to the storage reservoir 38 (as previously shown and described herein). One wall of this secondary chamber 764 is defined by a resilient diaphragm 766 carried at a lower end of a rigid valve poppet member 768. A second and somewhat smaller-area resilient diaphragm 770 is carried at an upper end of this rigid valve poppet member 768 and defines one wall of an upper control chamber 772 in flow communication with a third pressure port 774 coupled with the tap water inflow line 238.

The rigid valve poppet member 768 carrying the lower and upper diaphragms 766, 770 of differential area size is designed to operate a switch (not shown) used to turn the pump 136 on and off in response to the filled state of the pure water storage reservoir 38, as previously shown and described with respect to FIGS. 16 and 17. In addition, the valve poppet member 768 comprises or carries a magnet element 769 which attracts and retains a metal (stainless steel, or the like) keeper plate 782 on the underside of the lower, larger diaphragm 766. A valve stem 784 projects downwardly from the keeper plate 782 through the secondary chamber 764 and further through the tapered valve seat port 763 and the lower control chamber 762 for bearing engagement with an upper side of the valve head 756.

In normal operation, during pure water production, the pressure differential across the rigid valve poppet member 768 is sufficient to shift the poppet member 768 in a downward direction so that the valve stem 784 engages and opens the lower valve head 756 against the closure force applied by the biasing spring 758. In this mode, the open valve head 756 permits produced purified water from the RO cartridge 12 to flow through the ports 759 in the lower diaphragm, and further through the valve seat 760 and the two chambers 762, 764 to the pure water reservoir 38.

When the pure water reservoir 38 reaches a substantially filled condition, the pressure differential across the valve poppet member 768 causes upward shifting thereof with the valve stem 784. As the valve stem 784 displaces upwardly, a seal ring 790 thereon is moved into and sealingly engages the tapered valve seat or bore 763 separating the two chambers 762, 764. In a preferred form, this seal ring 790 has a quad or substantially I-beam cross sectional configuration as shown, to provide redundant axially spaced upper primary and lower secondary seal interfaces with the bore 763. Upon upward closure movement of the popper member 768 and associated valve stem 784, the upper primary seal initially displaces into the tapered bore 763 for sealing engagement therewith. Upon sealing, further upward displacement of the valve stem 784 is halted. If sealing is incomplete, the valve stem 784 displaces further upwardly within the tapered bore 763 (as shown in FIG. 20) so that the lower secondary seal on the seal ring 790 is also moved into sealing engagement therewith for positive valve closure. Alternately, if desired, other redundant seal ring configurations, such as duplicate O-rings or the like defining multiple or redundant seal interfaces may be used. In any event, such upward stem displacement is also accompanied by separation of the valve stem lower end from the valve head 756, whereby the biasing spring 758 now acts to positively displace the valve head 756 to a position closed on the associated seat 760. Thus, pure water flow through the RO membrane is positively halted with redundant seals provided by the valve head 756 and the seal ring 790 (which itself provides redundant diametric seals within the bore 763 carried by the common valve stem 784). When such sealing occurs, the pressure differential across the RO membrane is substantially eliminated, i.e., the pressure within the lower inlet chamber 754 slowly rises substantially to the tap water inflow pressure at the upper control chamber 772, thereby assisting in positive control valve closure. Persons skilled in the art will appreciate that the valve head 756 may be omitted, if desired.

When pure water is dispensed from the reservoir 38, the pressure level within the chamber 764 drops. After a sufficient volume of pure water is dispensed, such as several glass-type servings, the pressure falls sufficiently to shift the valve poppet member 768 downwardly for re-opening the valve head 756 and the seal ring 790 for resumed pure water production.

FIGS. 21-24 depict a modified manifold housing, which corresponds generally in structure and functional operation with the manifold housing 62 shown and described previously herein with respect to FIGS. 3-6. For convenience and consistency of description, components shown in FIGS. 21-24 are identified by reference numerals common to those used in FIGS. 3-6, increased in value by 800. Accordingly, the modified manifold housing 862 generally comprises a manifold base 868 and associated cover 881 for slidably receiving and supporting a multi-cartridge unit 36 (not shown in FIGS. 21-24) in flow-coupled relation with related system components (as previously shown and described, e.g., with respect to FIGS. 1 and 4-9). The multi-cartridge unit is removably carried on a slide-out drawer 880 having a front panel 884 carried thereby for normally closing the manifold housing 862 when the multi-cartridge unit is operationally installed.

The modified manifold housing 862 of FIGS. 21-24 includes an improved latch mechanism 802 for releasably retaining the front panel 884 in a normally fully closed position, with the multi-cartridge unit 36 therein properly and operationally coupled with related system components, and without risk of water leakage therebetween. This improved latch mechanism 802 is designed for secure, substantially fail-safe retention in the closed position, but can be opened quickly and easily when desired.

Figure 22:
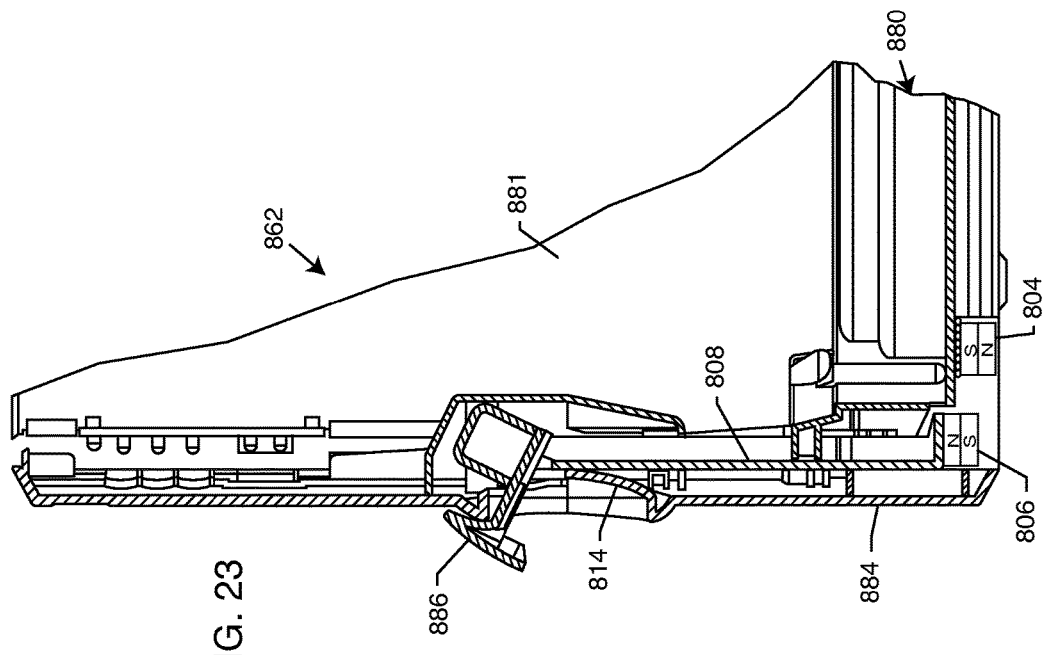
FIG. 22 is a fragmented vertical sectional view taken generally on the line 22-22 of FIG. 21, but showing the retractable drawer in the secure normally closed position.
Figure 23:
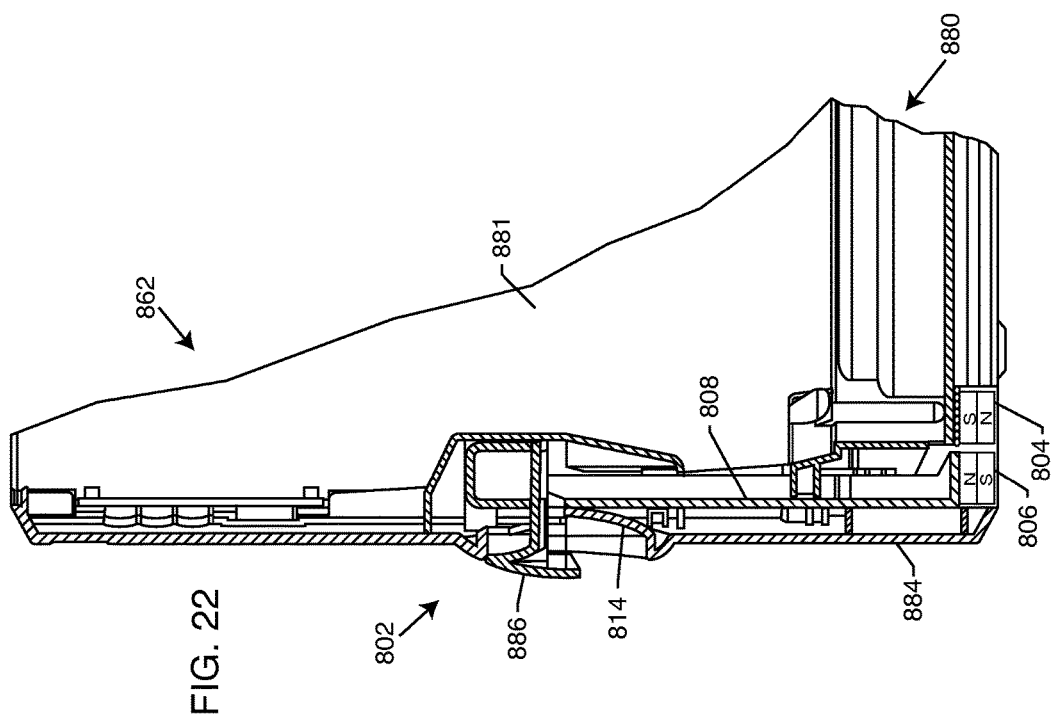
FIG. 23 is a fragmented vertical sectional view similar to FIG. 22, but illustrating the retractable drawer is the partially open position.

More particularly, the latch mechanism 802 includes a pair of magnets 804 and 806 carried respectively by the manifold base 868 and the front panel 884 for normal positioning in close proximity with each other, when the front panel 884 is in a fully closed position as viewed in FIG. 22. Importantly, in this fully closed position, the two magnets 804, 806 are oriented with their respective opposed magnetic poles (North and South) aligned so that the two magnets 804, 806 strongly attract each other to retain the front panel 884 in the fully closed position. FIG. 22 shows the base-mounted magnet 804 oriented with its South pole overlying the related North pole, and the panel-mounted magnet 806 oriented with its poles in a reverse configuration in respective alignment with the poles of the base-mounted magnet 804. The size and strength of these magnets 804, 806 are chosen to provide a sufficiently strong magnetic attraction force so that, as the front panel 884 is displaced toward the closed position, the magnets attract each other with a sufficient force to insure full panel/drawer closer with the multi-cartridge unit 36 fully and properly seated and engaged with the associated ports on the fixed manifold 74 (as viewed previously with respect to FIG. 7). In other words, the magnetic attraction is sufficiently strong to overcome any hydraulic line pressure at the inter-fitted ports, wherein such line pressure might otherwise preclude full engagement and result in water leakage at these connection sites.

The front panel 884 and associated slide-out drawer 880 can be quickly shifted quickly and easily to the open position for access to and replacement of the multi-cartridge unit, when and if desired. The panel-mounted magnet 806 is carried at a lower end of a vertically reciprocal slide bar 808 mounted at an inboard side of the front panel 884. This slide bar is slidably guided along a track 810, and has an upper end thereof pivotally coupled via one or more crank links 812 (FIG. 24) to a movable drawer pull 886. As shown, this drawer pull 886 is normally positioned in a "down" orientation disposed substantially within a recessed pocket 814 formed on an outboard face of the front panel 884, to correspondingly position the panel-mounted magnet 806 in an attraction orientation relative to the base-mounted magnet 804. The drawer pull 886 can be lifted through a short stroke (FIGS. 21 and 23-24) to lift the slide bar 808 and the panel-mounted magnet 806 sufficiently to shift the inter-magnet pole alignment to a repulsion orientation. That is, as viewed best in FIG. 23, the panel-mounted magnet 806 is lifted sufficiently to align its lower South pole with the upper South pole on the base-mounted magnet 804, resulting in a strong repulsion force which quickly and easily shifts the front panel 884 (and the slide-out drawer 880 coupled thereto) to a partially open position (FIGS. 21 and 23-24) with the multi-cartridge unit disengaged from the internally disposed fixed manifold 74 (FIG. 7). The thus-disengaged components permit further and easy manual slide-out displacement of the front panel 884 and drawer 880 to a fully open position for access to the multi-cartridge unit.

Thereafter, return slide-in displacement of the front panel 884 and associated drawer 880 is accompanied by return alignment of the magnets 804, 806 in the attraction orientation. That is, with the drawer pull 886 manually released, the panel-mounted magnet 806 falls by gravity back to the attraction orientation. As the panel-mounted magnet 806 approaches the base-mounted magnet 804 (upon drawer closure), the attraction force strongly pulls and retains the front panel 884 and associated drawer 880 to the fully and securely closed position. Conveniently, at this fully closed position is reached, downwardly protruding tabs 816 (FIG. 24) at a lower end of the slide bar 808 guide into and seat within upwardly open cut-outs or pockets 818 formed in the base 868 for further positive mechanical retention of the drawer 880 in the fully closed position. These tabs 816 are sized for pull-out disengagement from the associated pockets 818, when the drawer pull 886 is lifted (as previously described) for shifting the panel-mounted magnet 806 to the repulsion position.

Alternative combined magnetic and mechanical closure arrangements will be apparent to those persons skilled in the art.

Figure 21:
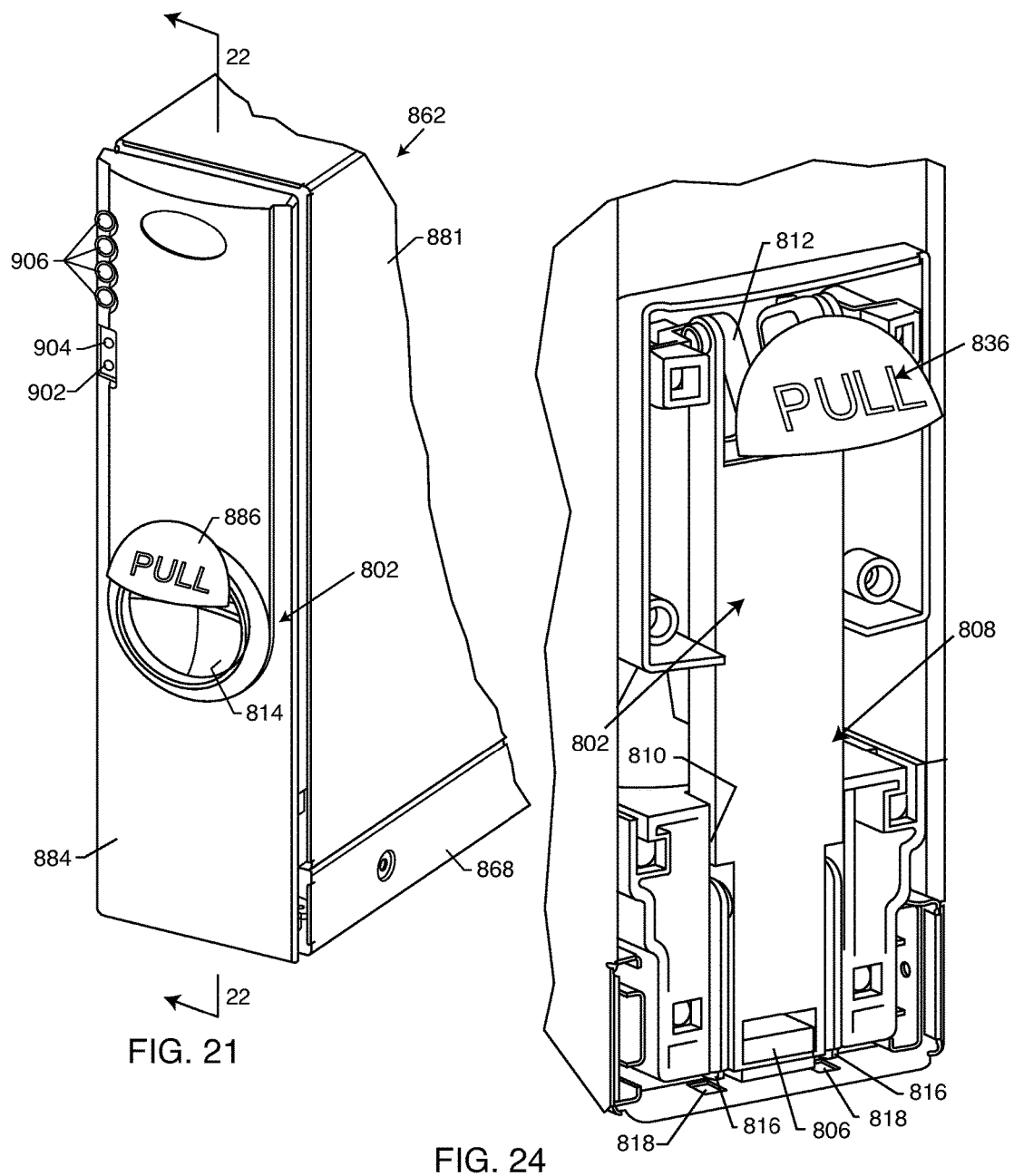
FIG. 21 is a fragmented perspective view similar to FIG. 3, but depicting a modified manifold housing having an improved latch mechanism for controlling movement of the cartridge-carrying retractable drawer between a secure normally closed position and an open position, with a front panel on the retractable drawer being depicted in a partially open position.

In a further embodiment of the invention, a power indicator light 902 may be carried on the manifold housing 862 as viewed in FIG. 21, for indicating that the reverse osmosis system is in a power-on state. In addition, a water quality light 904 may also be provided for indicating the state of water purity, wherein this light 904 is adapted for illumination at one color (such as blue or green) when the water quality is acceptable, and at a second color (such as yellow or red) when the water quality is not acceptable. In this regard, the water quality light 904 is, in a preferred form, provided in addition to the water quality lights 196, 198 as previously shown and described herein.

In addition, the manifold housing 862 may further carry a bank of purification life lights 906, such as the bank of four lights shown in FIG. 21. These purification life lights 906 provide an indication of the remaining estimated life of the multi-cartridge unit, based on total dispensed pure water outflow as measured by the flow meter 610 (FIG. 15). In a preferred form, the flow meter 610 is coupled via the monitor circuit 200 and associated memory 206 to the lights 906 to illuminate one or more of said lights 906 based on the estimated remaining life of the multi-cartridge unit.

In accordance with a still further aspect of the invention, the monitor circuit 200 (FIG. 15) may be programmed to energize the lights 196, 198 in a controlled manner, in response to predetermined user-initiated activity, for purposes of verifying that the system 10 continues to produce purified water of acceptable quality. In this regard, the system 10 is designed for relatively prolonged operation without requiring replacement of the RO cartridge 12 or other system components, whereby some users may begin to question whether the continued illumination of the light or lights 196 indicating acceptable water quality is in fact correct. To verify proper operation, the monitor circuit 200 may be preprogrammed for such verification, in response to a predetermined user-initiated action, such as turning the dispense faucet 20 on and off in a rapid sequence at least 3 times within a short time interval such as within about 10 seconds. When this activity is detected by the monitor circuit 200, by virtue of the flow signals provided by the flow meter 610 or the like, the monitor circuit 200 will controllably illuminate the lights 196 and 198, such as in an alternating blinking mode, for a predetermined number of times (such as 5), and then illuminate the light 196 or the light 198 associated with the most recent conductivity reading which is retained in the memory 206 of the monitor circuit 200. Such user-initiated verification of proper system operation may occur in response to a user-initiated telephone inquiry, and/or outlined in a system owner's manual.

A variety of further modifications and improvements in and to the improved reverse osmosis water purification system 10 of the present invention will be apparent to persons skilled in the art. By way of limited example, it will be appreciated that the components of the system 10 may be arranged in different configurations suitable for appropriate component access and service over an extended service life. In this regard, the post-treatment cartridge 160 may be disposed outside the multi-cartridge housing 62, such as alongside or on top of the catalyst pre-filter 16. In addition, if desired, the pump 136 may be mounted inside the multi-cartridge housing 62. Accordingly, no limitation on the invention is intended by way of the foregoing description and accompanying drawings, except as set forth in the appended claims.

What is claimed is:

1. A water purification system, comprising:
    a cartridge having a water inflow port for receiving a water inflow from a water supply system, in which the cartridge separates impurities from the water inflow, the cartridge discharging purified water via a purified water outflow port and discharging brine comprising the separated impurities via a brine outflow port; and
    a pre-filter coupled between the water inflow port and the water supply system, the pre-filter comprising:
        a pre-filter chamber;
        a pre-filter particulate media, contained within a portion of a volume of the pre-filter chamber when the particulate media is in a non-moving settled media state, for catalyzing at least one impurity from the water inflow;
        an inflow port coupled to the water supply system and configured to create an upward flow of water through the particulate media;
        a first outflow port coupled to the water inflow port of the cartridge; and
        a second outflow port adapted to be coupled to a water faucet of the water supply system; in which the particulate media remains in the settled media state when the water faucet is closed and the particulate media is abraded by the upward flow of water when the water faucet is open, such that the at least one impurity is catalyzed from the water inflow.

2. The water purification system of claim 1, further comprising a post-filter coupled to the purified water outflow port.

3. The water purification system of claim 2, in which the post-filter comprises a post-filter particulate media to remove at least one impurity from the water flowing from the purified water outflow port.

4. The water purification system of claim 3, in which the pre-filter particulate media and post-filter particulate media each comprises zinc.

5. The water purification system of claim 1, further comprising a purified water dispense faucet conduit coupled to the purified water outflow port, the purified water dispense faucet conduit being configured for dispensing the purified water.

6. The water purification system of claim 1, further comprising a storage reservoir coupled to the purified water outflow port, the storage reservoir being configured for storing a volume of the purified water.

7. The water purification system of claim 6, further comprising a purified water dispense faucet conduit coupled between the purified water outflow port and the storage reservoir.

8. The water purification system of claim 1, in which the water purification cartridge further comprises means for adding at least one selected mineral to water flowing out of the purified water outflow port.

9. The water purification system of claim 1, further comprising
    a housing;
    a latch assembly, coupled to said housing, in which a first position of the latch assembly closes the housing and a second position opens the housing, such that the cartridge is within the housing in the first position and removable from the housing in the second position.

10. The water purification system of claim 9, further comprising a monitor configured to provide an indication to replace the cartridge.

11. The water purification system of claim 10, in which the indication to replace the cartridge is reset when the cartridge is replaced.

12. The water purification system of claim 11, further comprising a Radio Frequency Identification (RFID) reader, coupled to the housing, in which the RFID reader resets the indication to replace the cartridge when the RFID reader determines a unique bar code printed on the cartridge being read changes.

13. A method for purifying water, comprising:
receiving an upward inflow of water from a water supply at a pre-filter;
catalyzing at least one impurity in the water inflow with a particulate media in the pre-filter, in which the particulate media is in a non-moving settled state when the water inflow is below a first rate and the particulate media is in an unsettled state when the water inflow is above the first rate, such that the particulate media is abraded when the water inflow is above the first rate;
receiving an output flow of the pre-filter at a cartridge;
discharging purified water via a purified water outflow port of the cartridge; and
discharging brine comprising the at least one catalyzed impurity of the water inflow via a brine outflow port of the cartridge.

14. The method of claim 13, further comprising removing at least one impurity from the purified water with a post-filter that is fluidly coupled to the purified water outflow port of the cartridge.

15. The method of claim 13, further comprising storing a volume of the purified water.

16. The method of claim 13, further comprising adding at least one selected mineral to water flowing out of the purified water outflow port.

17. The method of claim 13, further comprising monitoring the cartridge to determine whether to replace the cartridge.

18. The method of claim 17, further comprising resetting a cartridge indicator when the cartridge is replaced.

19. The method of claim 18, further comprising reading a unique bar code printed on the cartridge.

20. The method of claim 19, further comprising resetting the indicator when it is determined the unique bar code printed on the cartridge being read changes.

* * * * *